US008102885B2

(12) United States Patent  
Peyghambarian et al.

(10) Patent No.: US 8,102,885 B2
(45) Date of Patent: Jan. 24, 2012

(54) ALL-FIBER MODE SELECTION TECHNIQUE FOR MULTICORE FIBER LASER DEVICES

(75) Inventors: Nasser Peyghambarian, Tucson, AZ (US); Axel Schulzgen, Tucson, AZ (US); Li LI, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 435 days.

(21) Appl. No.: 12/117,532

(22) Filed: May 8, 2008

(65) Prior Publication Data

US 2009/0154503 A1 Jun. 18, 2009

Related U.S. Application Data

(60) Provisional application No. 60/928,161, filed on May 8, 2007.

(51) Int. Cl.
*H01S 3/30* (2006.01)
*H01S 3/08* (2006.01)

(52) U.S. Cl. .......................................................... 372/6

(58) Field of Classification Search .................. 372/6, 92, 372/98
See application file for complete search history.

(56) References Cited

U.S. PATENT DOCUMENTS

| | | | | |
|---|---|---|---|---|
| 5,566,196 A | * | 10/1996 | Scifres | 372/6 |
| 6,031,850 A | * | 2/2000 | Cheo | 372/6 |
| 6,982,997 B1 | * | 1/2006 | Jiang et al. | 372/6 |
| 7,107,795 B2 | | 9/2006 | Cheo | |
| 7,738,751 B1 | * | 6/2010 | Minden et al. | 372/6 |
| 2005/0169323 A1 | * | 8/2005 | Spariosu et al. | 372/9 |

OTHER PUBLICATIONS

P. Glas, et al. "A cw Diode-Pumped Single-Silica Fiber Comprising 40 Cores Used As Acitve Elements for a High Power Fiber Lasser At $\lambda = 1050$ nm," in Conference on Lasers and Electro-Optics (Optical Society of America, 1998), pp. 113-114.
P. Glas, et al. "The Multicore Fiber-A Novel Design for a Diode Pumped Fiber Laser," Opt. Commun. 151, 187-195 (1998).
Y Huo et al. "Thermomechanical Properties of High-Power and High-Energy Yb-Doped Silica Fiber Lasers," IEEE Photon. Technol. Lett. 16 759-761 (2004).

(Continued)

*Primary Examiner* — Jessica Stultz
*Assistant Examiner* — Phillip Nguyen
(74) *Attorney, Agent, or Firm* — Oblon, Spivak, McClelland, Maier & Neustadt, L.L.P.

(57) ABSTRACT

An optical device that includes 1) a gain section having a plurality of core regions including dopant species configured to absorb incident radiation at a first wavelength and emit radiation at a second wavelength, and 2) at least one passive section attached to the gain section. The gain section and the at least one passive section comprise an optical cavity which selectively promotes in-phase light emission from the optical cavity. An alternative optical device which includes a gain section having a plurality of core regions including dopant species configured to absorb incident radiation at a first wavelength and emit radiation at a second wavelength, and 2) two passive sections attached to the gain section at opposite ends. In this alternative optical device, the gain section and the two passive sections comprise an optical cavity which selectively promotes in-phase light emission from the optical cavity such that the light emission from the optical cavity, in a far field, has a singular Gaussian-like intensity distribution about a longitudinal axis extending from the optical cavity.

41 Claims, 15 Drawing Sheets

(a)

(b)

OTHER PUBLICATIONS

J. Crowe et al. "External Cavity Coupling and Phase Locking of Gallium Arsenide Injection Lasers," IEEE J. Quantum Electron. 4 169-172 (1968).
J.E. Ripper et al., "Optical Coupling of Adjacent Stripe-Geometry Junction Lasers," Appl. Phys. Lett. 17, 371,373 (1970).
E. M. Philipp-Rutz, "Spatially Coherent Radiation From an Array of GaAs Lasers," Appl. Phys. Lett. 26, 475-477 (1975).
D.R. Scifres, et al. "Phase-Locked Semiconductor Laser Array," Appl. Phys. Lett. 33, 1015-1017 (1978).
W.T. Tsang, et al. "A Densely Packed Monolithic Linear Array of $GzAs-Al_xGa_{1-x}$ Strip Buried Heterostructure Laser," Appl. Phys. Lett 34, 162-165 (1979).
D.E. Ackley, et al. "High-Power Leaky-Mode Multiple-Stripe Laser," Appl. Phys. Lett. 39, 27-29 (1981).
J. Katz, et al. "Phase-Locked Semiconductor Laser Array With Separate Contacts," Appl. Phys. Lett 43, 521-523(1983).
D. Botez et al. "High-Power Phase-Locked Arrays of Index-Guided Diode Lasers," Appl. Phys. Lett. 43, 1096-1098 (1983).
E. Kapon et al., "Supermode Analysis of Phase-Locked Arrays of Semiconductor Lasers," Opt. Lett. 10, 125-127 (1984).
S. Wang, et al. "In-Phase Locking in Diffraction-Coupled Phased-Array Diode Lasers," Appl. Phys. Lett. 48, 1770-1772 (1986).
Y. Huo et al., "Analysis of Transverse Mode Competition and Selection in Multicore Fiber Lasers," J. Opt. Soc. Am. B 22, 2345-2349 (2005).
H.F. Talbot, "Facts Relating to Optical Science No. IV," Philos. Mag. 9, 401-407 (1836).
C.R. Fernandez-Pousa, et al., "Talbot Conditions, Talbot Resonators, and First-Order Systems," J. Opt. Soc. Am. B 20, 638-643 (2003).
J.R. Leger, et al. "Coherent Addition of AlGaAs Lasers Using Microlenses and Diffractive Coupling," Appl. Phys. Lett. 52, 1771-1773 (1988).
F. X. D'Amato, et al. "Coherent Operation of an Array of Diode Lasers Using a Spatial Filter in a Talbot Cavity," Appl. Phys. Lett. 55, 816-818 (1989).
Y. Kono, et al. "A Coherent All-Solid-State Laser Array Using the Talbot Effect in a Three-Mirror Cavity," IEEE J. Quantum Electron. 36, 607-614 (2000).
A.M. Hornby et al., "Phase Locking of Linear Arrays of $CO_2$ Waveguide Lasers by the Waveguide-confined Talbot Effect," Appl. Phys. Lett. 63, 2591-2593 (1993).
P. Glas, et al. "Bessel Beam Like Emission Characteristics of a Neodymium-Doped Multicore Fiber Laser Using a Talbot Cavity," in Conference on Lasers and Electro-Optics (Optical Society of America, 2000), pp. 599-600.
M. Wrage, et al. "Phase Locking in a Multicore Fiber Laser by Means of a Talbot Resonator," Opt. Lett. 25, 1436-1438 (2000).
L. Michaille, et al. "Phase Locking and Supermode Selection in Multicore Photonic Crystal Fiber Lasers With a Large Doped Area," Opt. Lett. 30, 1668-1670 (2005).

P.K. Cheo et al., "A High-Brightness Laser Beam From a Phase Locked Multicore Yb-Doped Fiber Laser Array," IEEE Photon. Technol. Lett. 13, 439-441 (2001).
M. Wrage, et al., "Combined Phase Locking and Beam Shaping of a Multicore Fiber Laser by Structured Mirrors," Opt. Lett. 26, 980-982 (2001).
M. Wrage, et al., "Phase-Locking of a Multicore Fiber Laser by Wave Propagation Through an Annular Waveguide," Opt. Commun. 205, 367-375 (2002).
T. Pertsch, et al. "An All-Fiber Phase Locking Setup for Multicore Fiber Lasers," in Conference on Lasers and Electro-Optics Europe (IEEE, 2000), 314 pp.
P. Glas, et al. "Improvement of the Emission Characteristics of a Multicore Fiber Laser Using Selfreproduction in a Multimode Interference Device (MMI)," in Conference on Lasers and Electro-Optics Europe (IEEE, 2000), pp. 173.
Y. Huo, et al. "Fundamental Mode Operation of a 19-Core Phase-Locked Yb-Doped Fiber Amplifier," Opt. Express 12, 6230-6239 (2004).
L. Li et al., "Phase Locking and In-Phase Supermode Selection in Monolithic Multicore Fiber Lasers," Opt. Lett. 31, 2577-2579 (2006).
M. Wrage, et al. "Reconstruction of Field Distributions of an Active Multicore Fiber in Multimode Fibers," in Laser Resonators III, A.V. Kudryashov and A.H. Paxton, eds., Proc. SPIE 3930, 212-221 (2000).
Fimmwave, Photon Design Inc., UK, http://www.photond.com/., © 2006 Photon Design.
L. B. Soldano et al., "Optical Multi-Mode Interference Devices Based on Self-Imaging : Principles and Applications," J. Lightwave Technol. 13 615-627 (1995).
L. Li, et al. "Short-Length Microstructured Phosphate Glass Fiber Lasers With Large Mode Areas," Opt. Left. 30, 1141-1143 (2005).
L. Li, et al. "Ultracompact Cladding-Pumped 35-MM-Short Fiber Laser With 4.7-W Single-Mode Output Power," Appl. Phys. Lett. 88, 161106 (2006).
G.G. King, et al. "$M^2$ Measurements of Multicore Fiber Laser Array," in Technical Digest of the $16^{th}$ Solid State & Diode Laser Technology Review (Directed Energy Professional Society, 2003), paper P12.
H. Li, et al., "Multimode Interference in Circular Step-Index Fibers Studied With the Mode Expansion Approach," J. Opt. Soc. Am. B 24, 2707-2720 (2007).
X. Zhu, et al. "Birefringent In-Phase Supermode Operation of a Multicore Microstructured Fiber Laser," Optics Express, vol. 15, Issue 16, pp. 10340-10345 (2007).
L. Li, et al., "Phase-Locked Multicore All-Fiber Lasers: Modeling and Experimental Investigation," J. Opt. Soc. Am. B 24, 1721-1728 (2007).
U.S. Appl. No. 11/913,417, filed Nov. 2, 2007, Peyghambarian, et al.

* cited by examiner 21 medium 1 ($n_1$)

22 medium 2 ($n_2$)

23 medium 3 ($n_3$)

ALL-FIBER MODE SELECTION TECHNIQUE FOR MULTICORE FIBER LASER DEVICES

CROSS REFERENCE TO RELATED APPLICATIONS

This application is based upon and claims the benefit of priority under 35 U.S.C. §119(e) to U.S. Provisional Application No. 60/928,161 filed May 8, 2007 the entire contents of which are incorporated herein by reference. This application is related to U.S. Provisional Applications Nos. 60/677,069, filed May 3, 2005, No. 60/686,864 filed Jun. 2, 2005 No. 60/715,536 filed Sep. 8, 2005, and is related to PCT application PCT/US06/16923, and U.S. application Ser. No. 11/913,417. These applications listed are each incorporated herein by reference.

STATEMENT REGARDING FEDERALLY SPONSORED RESEARCH

This invention was made with government support under F49620-02-380 awarded by USAF/AFOSR. The government has certain rights in the invention.

DISCUSSION OF THE BACKGROUND

1. Field of the Invention

The invention relates to optical fiber lasers for use in communication networks and other laser applications where high laser power and good beam quality is required such as for example laser ablation and drilling as well as directed energy military applications.

2. Background of the Invention

Coherent beam combining of fiber lasers is an important technique toward developing compact high-power lasers with high brightness. One area of interest has been the recent emergence of fibers with multiple active cores. An optical fiber with a single core can either support a single transverse mode or multiple transverse modes to propagate along their axis and is, therefore, either called single mode or multimode fiber. In fact, single transverse mode fiber supports two modes with orthogonal polarization that have the same propagation constant in a symmetric (for instance circular symmetry) fiber. On the other hand, different transverse modes in multi-mode fiber have in general different propagation constants and other properties, e.g., different diffraction angles when the beam leaves the fiber.

Modern fiber fabrication techniques also allow incorporating multiple cores into the same cladding. Individual cores can either be single mode or multimode. These cores can either be interacting with each other (typically when the modes of individual cores overlap specially) or for all practical reasons non-interacting where light launched into an individual core will not be coupled into other cores during propagation. A multicore fiber (MCF) generally has a larger emitting area compared with a monocore fiber; meanwhile, as multiple emitters are distributed in an array and separated by passive regions, the thermal and stress problems encountered at high-power levels can be alleviated. However, if each emitter in the core array oscillates independently with random phase relationship, the output beam will diverge as fast as an individual emitter does. The low-brightness output beams from the incoherently combined core arrays will not be very beneficial for practical applications.

To coherently combine individual emitters and obtain a high-brightness output beam from the array, the relative phase between adjacent emitters should be locked, for example as demonstrated in early semiconductor laser arrays. For a typical MCF, the core array is typically either distributed in a ring, or distributed in a densely packed two-dimensional isometric pattern. In both scenarios, each single-mode core can evanescently couple with its neighboring cores, and different supermodes are formed and characterized by a fixed (locked) phase difference between adjacent emitters. Each supermode has its own distinctive intensity distribution and diffraction property, but only the fundamental in-phase supermode, i.e., all cores locked in the same phase, has a Gaussian-like far-field intensity distribution with an intensified central lobe of low divergence.

However, since mode competition exists inevitably in MCF laser cavities, it is equally important to build a fiber a laser cavity that establishes solely the in-phase mode and suppresses all higher-order modes.

To coherently combine the emissions of a core array into a phase-locked supermode, it is essential to develop a selective feedback mechanism that supports only one specific supermode with maximal gain and minimal loss while it discriminates all other modes with less gain and higher loss during cavity round trip. There currently exist a number of different mode selection techniques including Talbot-cavities, Fourier transform resonators, structured mirrors, and diffractive optics approaches to phase-lock multiple active cores (and also other multi-element gain structures such as doped waveguides or a number of singe-core fiber amplifiers) into exclusive fundamental in-phase mode operation. See FIGS. 4(a)-(b). However, all previously known techniques and laser cavity designs involve bulk optical components and free-space optics.

For example, among recent approaches to provide such a differential feedback, one scheme is to utilize the Talbot effect, which has been demonstrated earlier with diode, microchip, and $CO_2$ waveguide laser arrays. Talbot cavity MCF lasers have also been reported recently with phase-locked high-brightness output beams obtained. However, in these MCF lasers, free-space optics, i.e., air gaps and bulk optical components, has become an inseparable part.

Further, the presence of free-space optics in a fiber laser cavity is practically undesirable, because it not only substantially expands the device size from a single piece of fiber to a bulky open-space setup but also introduces more cavity loss. In addition, the free-space optics, i.e. air gaps in the laser cavity and bulk optical components, not only cause alignment difficulties but also instabilities during high power laser operation. These serious stability issues can occur at high-power laser operation, e.g., thermal or environmental disturbances can easily affect the crucial and delicate cavity alignment. Because the unavoidable thermal changes of the optical components with increasing power will deteriorate the alignment and seriously affect the device performance, not to mention the decrease of laser efficiency due to additional cavity losses. It is clearly favorable to achieve an all-fiber aligning-free solution to phase lock multiple active cores for fiber laser devices in high-power operation. Therefore, it is a strong preference to eliminate any free-space optics and force the supermode selection to occur inside a confined waveguide, ideally, within an optical fiber. This will result in a truly all-fiber phase-locked MCF laser, which is free of optical alignment and robust against external disturbances.

In earlier all-fiber approaches to phase lock the emissions of a core array, the out-of-phase supermode has been selected by either an annular waveguide or a fiber mirror, while the in-phase supermode amplification has been achieved with a pulsed Gaussian beam.

Thus, while multicore fiber lasers that operate in a phase-locked status have great potential to provide high-power output beams with excellent beam quality and almost unlimited power scalability, current mode selection techniques, including the Talbot-cavities, Fourier transform resonators, structured mirrors, and/or diffractive optics approaches (to phase lock the multiple active cores into the in-phase supermode), all involve bulk optical components and free-space optics.

Numerous articles on the development of optical fibers, fiber amplifiers and fiber lasers with multiple gain elements have been reported such as the following reference articles all of which are incorporated herein by reference:

1. P. Glas, M. Naumann, A. Schirrmacher, and T. Pertsch, "A cw diode-pumped single-silica fiber comprising 40 cores used as active elements for a high power fiber laser at $\lambda=1050$ nm," in *Conference on Lasers and Electro-Optics* (Optical Society of America, 1998), pp. 113-114.
2. P. Glas, M. Naumann, A. Schirrmacher, and T. Pertsch, "The multicore fiber—a novel design for a diode pumped fiber laser," Opt. Commun. 151, 187-195 (1998).
3. Y. Huo and P. K. Cheo, "Thermomechanical properties of high-power and high-energy Yb-doped silica fiber lasers," IEEE Photon. Technol. Lett. 16, 759-761 (2004).
4. J. Crowe and W. Ahearn, "External cavity coupling and phase locking of gallium arsenide injection lasers," IEEE J. Quantum Electron. 4, 169-172 (1968).
5. J. E. Ripper and T. L. Paoli, "Optical coupling of adjacent stripe-geometry junction lasers," Appl. Phys. Lett. 17, 371-373 (1970).
6. E. M. Philipp-Rutz, "Spatially coherent radiation from an array of GaAs lasers," Appl. Phys. Lett. 26, 475-477 (1975).
7. D. R. Scifres, R. D. Burnham, and W. Streifer, "Phase-locked semiconductor laser array," Appl. Phys. Lett. 33, 1015-1017 (1978).
8. W T. Tsang, R. A. Logan, and R. P. Salathe, "A densely packed monolithic linear array of GaAs—$Al_xGa_{1-x}$ strip buried heterostructure laser," Appl. Phys. Lett. 34, 162-165 (1979).
9. D. E. Ackley and R. W. H. Engelmann, "High-power leaky-mode multiple-stripe laser," Appl. Phys. Lett. 39, 27-29 (1981).
10. J. Katz, E. Kapon, C. Lindsey, S. Margalit, U. Shreter, and A. Yariv, "Phase-locked semiconductor laser array with separate contacts," Appl. Phys. Lett. 43, 521-523 (1983).
11. D. Botez and J. C. Connolly, "High-power phase-locked arrays of index-guided diode lasers," Appl. Phys. Lett. 43, 1096-1098 (1983).
12. E. Kapon and J. Katz, "Supermode analysis of phase-locked arrays of semiconductor lasers," Opt. Lett. 10, 125-127 (1984).
13. S. Wang, J. Z. Wilcox, M. Jansen, and J. J. Yang, "In-phase locking in diffraction-coupled phased-array diode lasers," Appl. Phys. Lett. 48, 1770-1772 (1986).
14. Y. Huo and P. K. Cheo, "Analysis of transverse mode competition and selection in multicore fiber lasers," J. Opt. Soc. Am. B 22, 2345-2349 (2005).
15. H. F. Talbot, "Facts relating to optical science No. IV," Philos. Mag. 9, 401-407 (1836).
16. C. R. Fernándnez-Pousa, M. T. Flores-Arias, C. Bao, M. V. Pérez, and C. Gomez-Reino, "Talbot conditions, Talbot resonators, and first-order systems," J. Opt. Soc. Am. B 20, 638-643 (2003).
17. J. R. Leger, M. L. Scott, and W. B. Veldkamp, "Coherent addition of AlGaAs lasers using microlenses and diffractive coupling," Appl. Phys. Lett. 52, 1771-1773 (1988).
18. F. X. D'Amato, E. T. Siebert, and C. Roychoudhuri, "Coherent operation of an array of diode lasers using a spatial filter in a Talbot cavity," Appl. Phys. Lett. 55, 816-818 (1989).
19. Y. Kono, M. Takeoka, K Uto, A. Uchida, and F. Kannari, "A coherent all-solid-state laser array using the Talbot effect in a three-mirror cavity," IEEE J. Quantum Electron. 36, 607-614 (2000).
20. A. M. Hornby, H. J. Baker, A. D. Colley, and D. R. Hall, "Phase locking of linear arrays of $CO_2$ waveguide lasers by the waveguide-confined Talbot effect," Appl. Phys. Lett. 63, 2591-2593 (1993).
21. P. Glas, D. Fischer, M. Sandrock, M. Wrage, and T. Pertsch, "Bessel beam like emission characteristics of a neodymium-doped multicore fiber laser using a Talbot cavity," in *Conference on Lasers and Electro-Optics* (Optical Society of America, 2000), pp. 599-600.
22. M. Wrage, P. Glas, D. Fischer, M. Leitner, D. V. Vysotsky, and A. P. Napartovich, "Phase locking in a multicore fiber laser by means of a Talbot resonator," Opt. Lett. 25, 1436-1438 (2000).
23. L. Michaille, C. R. Bennett, D. M. Taylor, T. J. Shepherd, J. Broeng, H. R. Simonsen, and A. Petersson, "Phase locking and supermode selection in multicore photonic crystal fiber lasers with a large doped area," Opt. Lett. 30, 1668-1670 (2005).
24. P. K. Cheo, A. Liu, and G. G. King, "A high-brightness laser beam from a phase-locked multicore Yb-doped fiber laser array," IEEE Photon. Technol. Lett. 13, 439-441 (2001).
25. M. Wrage, P. Glas, and M. Leitner, "Combined phase locking and beam shaping of a multicore fiber laser by structured mirrors," Opt. Lett. 26, 980-982 (2001).
26. M. Wrage, P. Glas, D. Fischer, M. Leitner, N. N. Elkin, D. V. Vysotsky, A. P. Napartovich, and V. N. Troshchieva, "Phase-locking of a multicore fiber laser by wave propagation through an annular waveguide," Opt. Commun. 205, 367-375 (2002).
27. T. Pertsch, P. Glas, M. Wrage, and F. Lederer, "An all-fiber phase locking setup for multicore fiber lasers," in Conference on Lasers and Electro-Optics Europe (EEEE, 2000), 314 pp.
28. P. Glas, D. Fischer, M. Leitner, T. Sandrock, M. Wrage, T. Pertsch, A. P. Napartovich, N. N. Elkin, A. G. Sukharev, V. N. Troshchieva, and D. V. Vysotsky, "Improvement of the emission characteristics of a multicore fiber laser using selfreproduction in a multimode interference device (MMI)," in *Conference on Lasers and Electro-Optics Europe* (IEEE, 2000), pp. 173.
29. Y. Huo, P. Cheo, and G. King, "Fundamental mode operation of a 19-core phase-locked Yb-doped fiber amplifier," Opt. Express 12, 6230-6239 (2004).
30. L. Li, A. Schülzgen, S. Chen, V. L. Temyanko, J. V. Moloney, and N. Peyghambarian, "Phase locking and in-phase supermode selection in monolithic multicore fiber lasers," Opt. Lett. 31, 2577-2579 (2006).
31. M. Wrage, P. Glas, M. Leitner, T. Sandrock, N. N. Elkin, A. P. Napartovich, and D. V. Vysotsky, "Reconstruction of field distributions of an active multicore fiber in multimode fibers," in *Laser Resonators III*, A. V. Kudryashov and A. H. Paxton, eds., Proc. SPIE 3930, 212-221 (2000).
32. Fimmwave, Photon Design Inc., UK, http://www.photond.com/.
33. L. B. Soldano and E. C. M. Pennings, "Optical multimode interference devices based on self-imaging: principles and applications," J. Lightwave Technol. 13, 615-627 (1995).

34. L. Li, A. Schülzgen, V. L. Temyanko, T. Qiu, M. M. Morrell, Q. Wang, A. Mafi, J. V. Moloney, and N. Peyghambarian, "Short-length microstructured phosphate glass fiber lasers with large mode areas," Opt. Lett. 30, 1141-1143 (2005).

35. L. Li, A. Schülzgen, V. L. Temyanko, M. M. Morrell, S. Sabet, H. Li, J. V. Moloney, and N. Peyghambarian, "Ultra-compact cladding-pumped 35-mm-short fiber laser with 4.7-W single-mode output power," Appl. Phys. Lett. 88, 161106 (2006).

36. G. G. King and P. K. Cheo, "$M^2$ measurements of multi-core fiber laser array," in *Technical Digest of the 16th Solid State & Diode Laser Technology Review* (Directed Energy Professional Society, 2003), paper P-12.

37. H. Li, M. Brio, L. Li, A. Schülzgen, N. Peyghambarian, and J. V. Moloney, "Multimode interference in circular step-index fibers studied with the mode expansion approach," J. Opt. Soc. Am. B 24, 2707-2720 (2007).

38. X. Zhu, A. Schülzgen, L. Li, H. Li, V. L. Temyanko, J. V. Moloney, and N. Peyghambarian, "Birefringent in-phase supermode operation of a multicore microstructured fiber laser," Optics Express, Vol. 15, Issue 16, pp. 10340-10345 (2007).

39. L. Li, A. Schülzgen, H. Li, V. L. Temyanko, J. V. Moloney, and N. Peyghambarian, "Phase-locked multicore all-fiber lasers: modeling and experimental investigation," J. Opt. Soc. Am. B 24, 1721-1728 (2007).

40. Scifres, U.S. Pat. No. 5,566,196, Oct. 15, 1996.
41. Cheo, U.S. Pat. No. 6,031,850, Feb. 29, 2000.
42. Cheo, U.S. Pat. No. 7,107,795, Sep. 19, 2006.

SUMMARY OF THE INVENTION

In one embodiment of the invention, there is provided an optical device that includes 1) a gain section having a plurality of core regions including dopant species configured to absorb incident radiation at a first wavelength and emit radiation at a second wavelength, and 2) at least one passive section attached to the gain section. The gain section and the at least one passive section comprise an optical cavity which selectively promotes in-phase light emission from the optical cavity.

In another embodiment of the invention, there is provided an optical device that includes 1) a gain section having a plurality of core regions including dopant species configured to absorb incident radiation at a first wavelength and emit radiation at a second wavelength, and 2) two passive sections attached to the gain section at opposite ends. The gain section and the two passive sections comprise an optical cavity which selectively promotes in-phase light emission from the optical cavity such that the light emission from the optical cavity, in a far field, has a singular Gaussian-like distribution about a longitudinal axis extending from the optical cavity.

In another embodiment of the invention, there is provided an optical device that includes 1) a gain section having a plurality of core regions including dopant species configured to absorb incident radiation at a first wavelength and emit radiation at a second wavelength, and 2) two passive sections attached to the gain section at opposite ends, The gain section and the two passive sections comprise an all-fiber optical cavity which selectively promotes in-phase light emission from the optical cavity.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
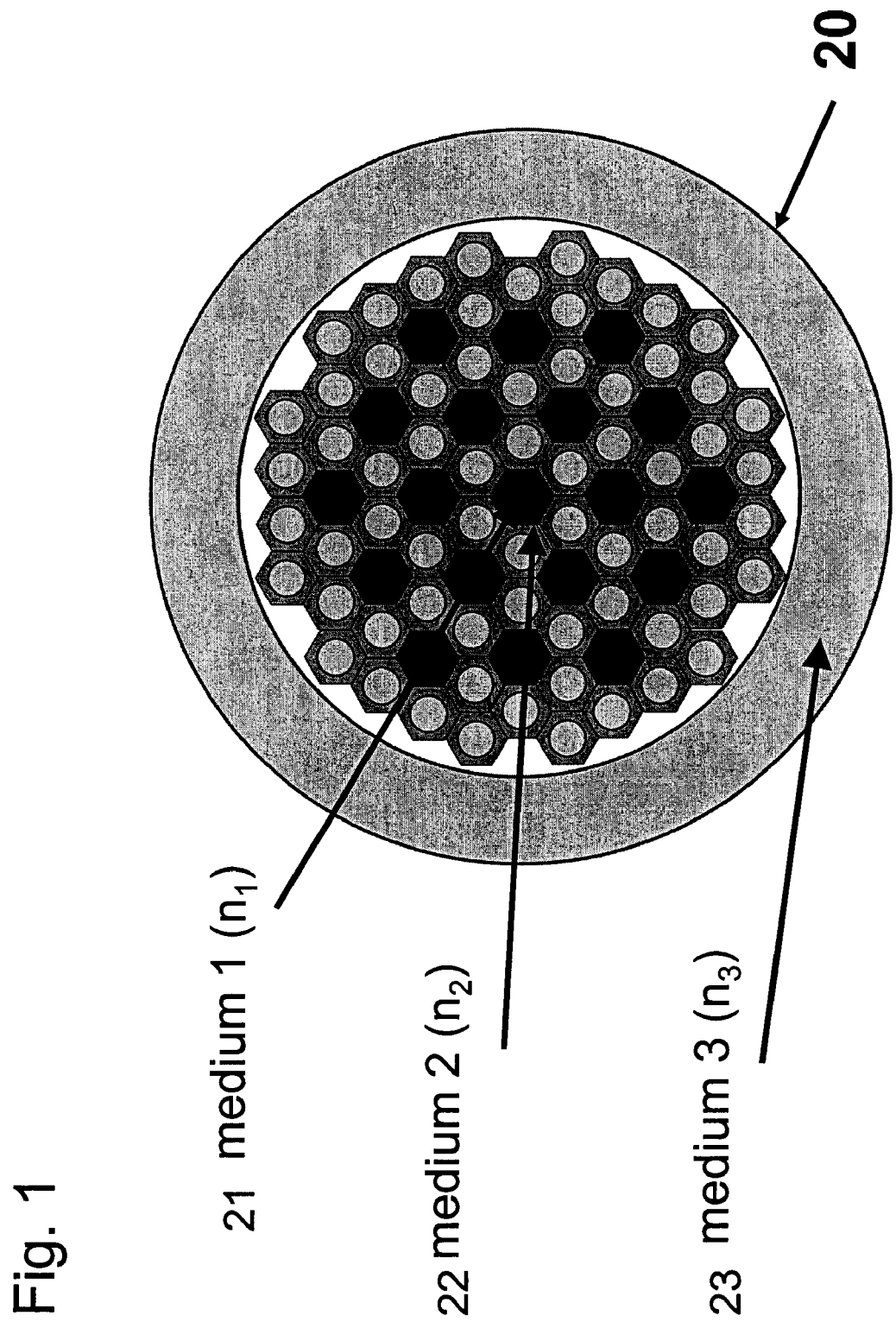
FIG. 1 is a schematic illustration of a typical cross section of a multicore fiber

One embodiment of the present invention considers multicore fiber with various numbers N of individual single mode cores. In addition, in this embodiment attention is focused on multicore fiber with interacting cores. The fiber cores are doped with rare-earth ions to provide optical gain within the fiber optical cavity or laser cavity. The laser cavity also has passive multimode segments at either one or both sides of the multicore gain fiber and feedback elements on the cavity sides that distinguish fiber lasers from simple fiber amplifiers without optical feedback. The same (passive multimode section) scheme can also be extended to multicore fiber with non-interacting cores. In this case the core coupling takes place in the multimode section of the fiber laser cavity in contrast to core-core interaction in the multicore fiber segment as described in previous devices.

If a fiber laser consists of multiple (N) single mode cores that are coupled to each other (either within the multicore fiber segment or within other segments of the laser cavity), the propagation of light within the laser cavity can no longer be treated as the sum of the propagation in individual cores. Instead the propagation is better described by a set of coupled propagation equations also known as coupled mode theory. The modal solution of this coupled core system is a set of 2×N super-modes (again the 2 because of the 2 possible polarization states for each super-mode). Similar to multimode fiber, each super-mode is characterized by a specific propagation constant and propagation properties. Also, each super-mode has a characteristic spatial electric field distribution across the fiber cross-section and a specific phase relation for mode segments that propagate in the different cores. Spatial distributions and phase relations can have very complex structures in particular for systems with large numbers of cores.

There is one super-mode with very distinct properties. The so-called fundamental in phase super-mode is characterized by the smallest divergence angle when the mode exits the multicore fiber that results (in particular for fiber with large numbers of cores) in a very desirable far field intensity distribution that is Gaussian-like and nicely centered with very few intensity outride the central lobe. Higher order super-modes have a larger diffraction angle and their far-field intensity distribution often consist of several weakly connected maxima.

Therefore, for most laser applications that require high beam quality, it is highly desirable to design a multicore fiber laser cavity that exclusively emits the fundamental super-mode of the multicore gain fiber while emission from higher order super-modes is suppressed due to the specific fiber laser cavity design. Such multicore fiber lasers that operate in the fundamental super-mode with locked in-phase emission from multiple cores have great potential to provide high-power output beams with excellent beam quality and almost unlimited power scalability.

The present invention demonstrates the first all-fiber laser cavity that utilizes multicore fiber as the optical gain element (for scalable output power) and additional exclusively fiber based cavity components while forcing the laser to operate in the fundamental in-phase super-mode. The approach prepares a multicore fiber of appropriate length, as the gain medium, and fusion splice passive fibers at both ends of this active fiber. Dielectric mirrors, served as the input and output couplers, are coated at the two passive fiber ends, respectively. This fiber device will be pumped from one end, the input coupler end, and the signal laser power will exit from the output coupler end. The passive fibers spliced at both the pump and output ends need their length to be accurately controlled, but not necessarily of the same length, to effectively select the favorable in-phase mode. The resulting output beam is a slowly-diverging Gaussian-shaped supermode in the far-field, in sharp contrast to a fast-diverging messy beam profile obtained from the same multicore fiber without the mode-selecting passive fibers.

This approach takes advantage of both the Talbot effect and diffraction effect to select the in-phase supermode, and the complete laser device is one single fiber chain, which completely solves alignment and instability problems encountered in any free-space optics approach. This all-fiber laser device will also have higher laser efficiency because of reduced cavity losses, resulting from low-loss at the fusion splices and low-loss passive fibers. Last, but not the least, by eliminating the bulk and free-space optics, this all-fiber device is extremely spacing-saving and can be seamlessly integrated into compact photonics devices.

Figure 2:
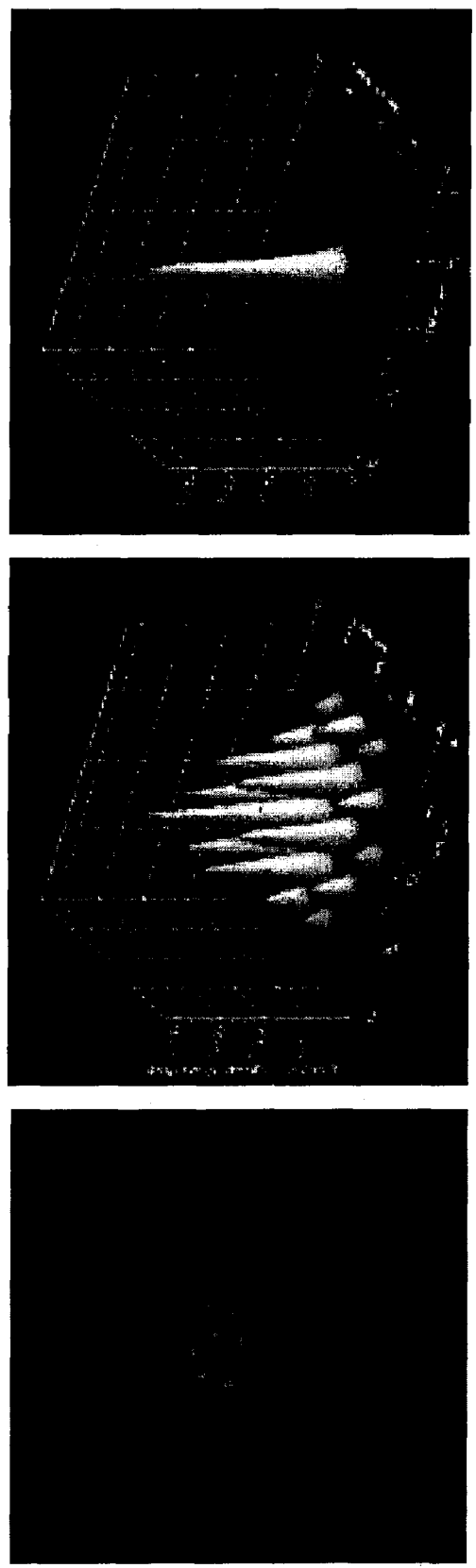
FIG. 2 is a microscopic image of the active 19-core fiber (a) with calculated near-field (b) and far-field (c) intensity distributions of the fundamental in-phase supermode.
Figure 5:
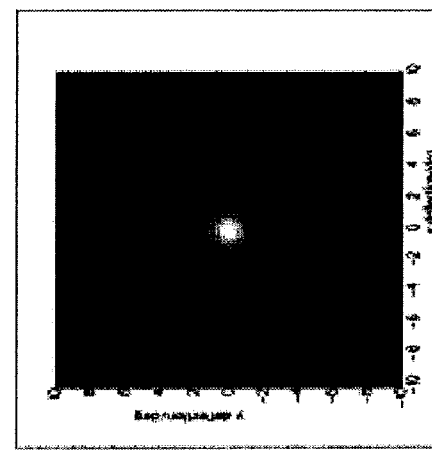
FIG. 5 illustrates an isometrically distributed 19-core MCF: (a) shows the cross section, (b) shows a simulated near-field distribution of the in-phase supermode, and (c) shows a simulated far-field distribution of the in-phase supermode.
Figure 5:
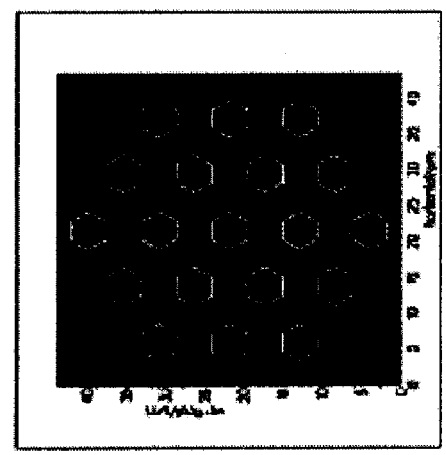
Figure 5:
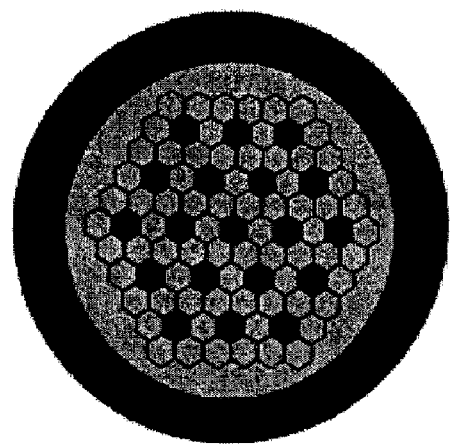

Referring now to the drawings, wherein like reference numerals designate identical or corresponding parts throughout the several views, in FIG. 1. FIG. 1 depicts in cross section, an active fiber with 19 Er/Yb co-doped fiber cores embedded in an inner cladding that is surrounded by an outer cladding with lower refractive index. In one embodiment, the multicore fiber lasers exhibit a Gaussian-like far-field intensity distribution. A laser cavity is formed in this embodiment by adding passive multimode fiber segments either on one or on both sides of the multicore gain fiber (see FIG. 3). A second passive segment in one embodiment has been shown to improve the stability of the in-phase super-mode operation. Without the passive fiber segments, the multicore fiber laser emits several super-modes that have enough gain and feedback to reach the lasing threshold (the diagram shown in FIG. 2 consists of emission from several super-modes). Adding appropriate amounts of passive, coreless fiber at both ends of the active multiple core fiber results in an all-fiber laser device that can operate in one transverse mode. This mode shows low diffraction and a near Gaussian spatial profile in the far field. (The far-field shown in FIG. 5(c) is observed under exclusive in-phase super-mode operation.) This super-mode selectivity is due to the different propagation properties of different super-modes inside the passive fiber sections which are in turn the result of different spatial distribution, phase relations, and diffraction properties.

This all-fiber super-mode selection technique can also be applied to different numbers of cores and different core arrangements in the multi-core gain fiber. In general both periodic and non-periodic core patterns could also be utilized. Finally, it has been demonstrated that the ability to build different core patterns into the multicore fiber can be utilized to design the properties of the in-phase super-mode, for instance making it birefringent, which means that the propagation constants of the two different polarization states of the fundamental in-phase super-mode are different and not degenerated as in previous circular symmetric multi-core patterns.

Thus, described below is a novel compact all-fiber MCF laser that can solely oscillates at the in-phase mode, with the complete device being a single fiber chain of ~10 cm in length. In this monolithic fiber device, the in-phase mode is selected by multi-mode noncore optical fibers spliced to the active MCF, resulting in elimination of the necessity of free-space and bulk optics. This all-fiber modal selection approach not only drastically simplifies the cavity geometry but also results in stable and robust phase-locked laser operation.

In one illustrative example to be discussed in more detail below, a nineteen (19) multi-core fiber (MC19) was fabricated and tested with spliced non-core fiber (NCF) ends of various lengths. Modal selectivity was improved by adding the NCF at both ends of the MC19, and high-quality output beams with Gaussian-like intensity distributions were observed in the far field. In one illustrative example to be discussed in more detail below, an upgraded 37-core array demonstrated in-phase mode oscillation utilizing this same all-fiber approach.

The techniques for fabrication of the MCF sections involve the making of preforms by stacking in the preforms tubes and rods and then drawing the fiber from the resulting stack (PCF). The making and fabrication of MCF sections was described in the afore-mentioned PCT application PCT/US06/16923, whose contents are incorporated herein by reference. This capability allows one to produce fibers of any geometry with any number of cores and air holes, as well as their arbitrary positions. Moreover, various configurations for the final MCF include but are not limited to symmetric and asymmetric cladding shapes, single and multiple core arrangements including a periodic air hole arrangement and any combination of the above such as photonic crystal structures with multiple cores.

In one embodiment, phosphate glasses can be used for the MCF. Phosphate glasses have a high solubility of rare-earth ions and low clustering effects, which allows an increase in the concentration of $Er^{3+}$ ($1.1 \times 10^{26}$ ions/m$^3$) and $Yb^{3+}$ ($8.6 \times 10^{26}$ ions/m$^3$) ions without enhancing the detrimental quenching processes. In addition, the MCF sections can be fabricated with variable core sizes ranging for example from 9 μm to 32 μm.

As is shown in FIG. 1 multiple cores that can be incorporated into a single fiber and emit laser light simultaneously have been realized by the multi-core packing structure. In this structure, the region with the first medium M1 21 surrounded by the second medium M2 22 serves as a light guiding core. As depicted in FIG. 1, optical device 20 includes a core region including a first medium having a predetermined refractive index $n_1$. As shown in FIG. 1, the inner cladding is surrounded by an outer cladding that includes a third medium 23 with refractive index $n_3$.

In one embodiment, the outer cladding region 22 and the central region 21 are part of an optical gain section of a fiber amplifier. A plurality of microstructures including media 1 and 2 can be arranged as a periodic array, such as for example the array shown in FIG. 1. Other suitable array patterns are possible including for example circular, square, and rectangular arrays.

Suitable materials for the cladding region 22 include silica, silicate, phosphate, chalcogenide or fluoride glasses. Suitable materials for the central region 21 include silica silicate, phosphate, chalcogenide or fluoride glasses. In various embodiments, the MCF section has a core area greater than 200 μm$^2$, and in theory there is no upper limit to the core area.

In one embodiment of the invention, the refractive index of the fourth medium is greater than the refractive index of the first medium. Further, in one embodiment, the inner cladding region 22 and the central region 21 can be formed to have a stepped refractive index structure in which inner cladding region 22 and the central region 21 have different refractive indices across a boundary between the two. In one embodiment of the invention, the central region 21 by way of the first or the second medium would include an absorption medium having a dopant configured to absorb incident radiation and generate photons through emission from excited ions. Dopants such as Er, Yb, Nd, Ho, and Pr, or metals such as Fe and Cr are used at concentrations of at least 10$^{20}$ cm$^3$, other suitable dopants include all rare-earth elements, in addition to the list above. The ion concentrations of the present invention range, for example, from 10$^{20}$ to 10$^{21}$ cm$^3$.

In one embodiment of the invention, nineteen multicore (MC19) cores made from heavily Er—Yb codoped phosphate glass, with 1.5 wt. % $Er_2O_3$ and 8.0 wt. % $Yb_2O_3$ formed in a phosphate glass matrix. The MC19 had an outer diameter of 200 μm and a 10 cm length, and a pump-confining inner cladding diameter of 110 μm. The cladding material was also a $P_2O_5$ based glass but without rare-earth doping. Each individual core has an effective diameter of 7.6 μm and a NA of 0.12 at ~1.5 μm. Each individual core had a single mode with a full angular spread of 15. By butt-coupling one end of the MC19 against a multimode pump-delivery non-core fiber that had a broadband high-reflector (at ~1.5 μm) coated on its facet, the 975 nm pump light was launched into the MC19 cladding. The MC19 started to lase at a pump threshold of ~4 W.

Figure 3A:
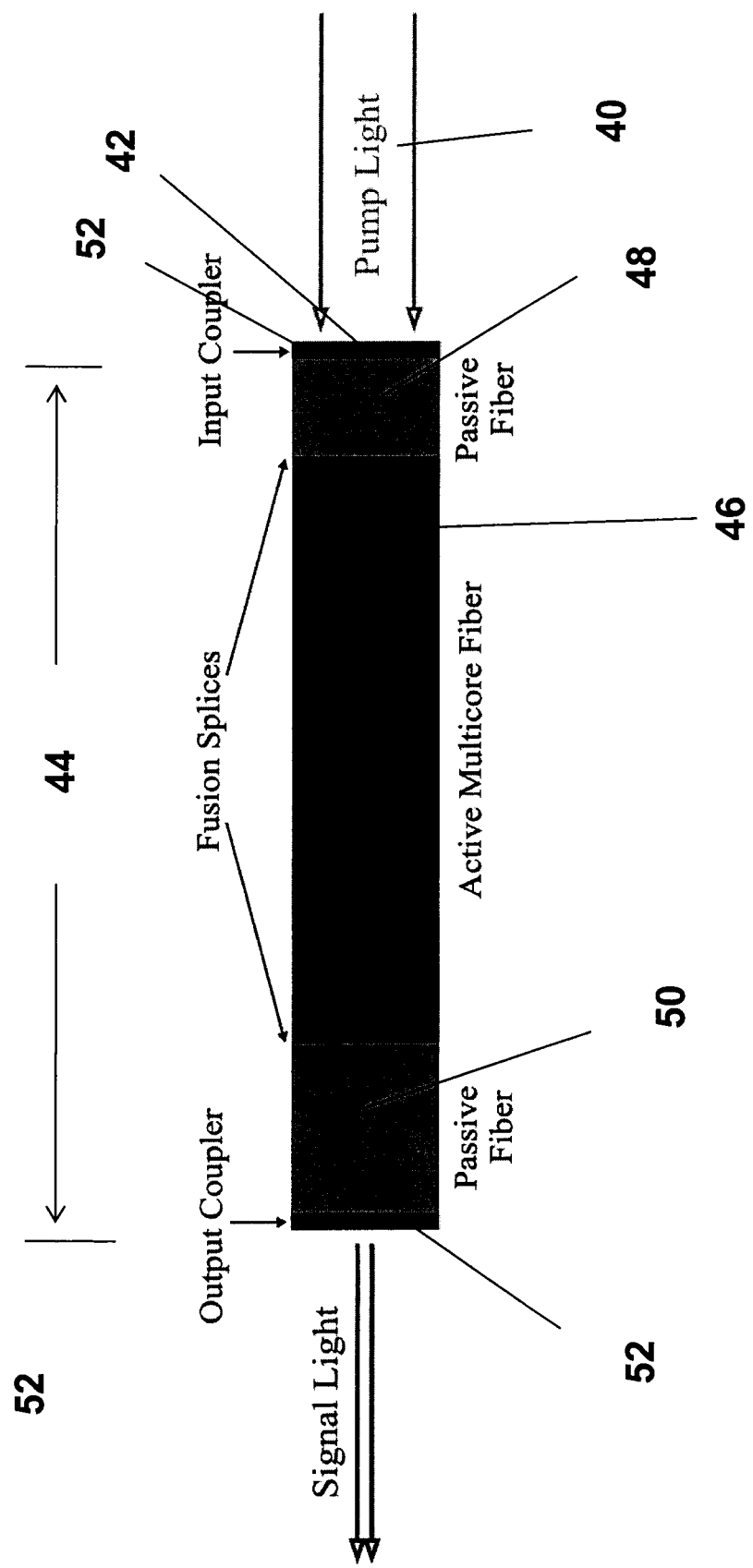
FIG. 3A is an illustration of the fiber laser device: both ends of the multicore fiber are spliced to passive fibers that are coated with dielectric mirrors (length not to scale)

In one embodiment of the present invention, as shown in FIG. 3A, there is included an optical pumping device 40 that optically excites through an end 42 of the fiber laser device 44. In this embodiment, there is provided a multicore fiber 46 of appropriate length (acting as a gain medium) and fusion splice passive fibers 48, 50 at both ends of the multicore fiber 46. Dielectric mirrors 52, serving as input and output couplers, are coated on the outside ends of the two passive fiber ends, respectively. Suitable materials to fabricate these dielectric mirrors include $SiO_2$, $Ta_2O_5$, $TiO_2$ and $Al_2O_3$. In this configuration, the fiber laser device 44 is pumped from one end (i.e., the input coupler end), and the signal laser power will exit from the output coupler end. The passive fibers 48, 50 are spliced at both the pump and output ends and need their length to be accurately controlled, but not necessarily of the same length, to effectively select the favorable in-phase mode. The resulting output beam is a slowly-diverging beam with a Gaussian-like intensity distribution in the far-field, in sharp contrast to a fast-diverging messy beam profile obtained from the same multicore fiber without the mode-selecting passive fibers 48, 50.

This aspect of the invention takes advantage of both the Talbot effect and diffraction effect to select the in-phase supermode, and the complete laser device is one single fiber chain itself, which solves the alignment and instability problems encountered in any free-space optics approach during high-power laser operation. This all-fiber laser device will also have higher laser efficiency because of the reduced cavity losses, resulting from the low-loss at the fusion splices process and the low-loss passive fibers. Passive fiber segments can be made of low-loss optical fibers with very similar material properties as the active multicore fiber resulting in mechanically stable splices with negligible splicing losses because of almost identical refractive indices. Furthermore, by eliminating the bulk and free-space optics, this all-fiber device saves space and can be seamlessly integrated into compact photonics devices.

Figure 3B:
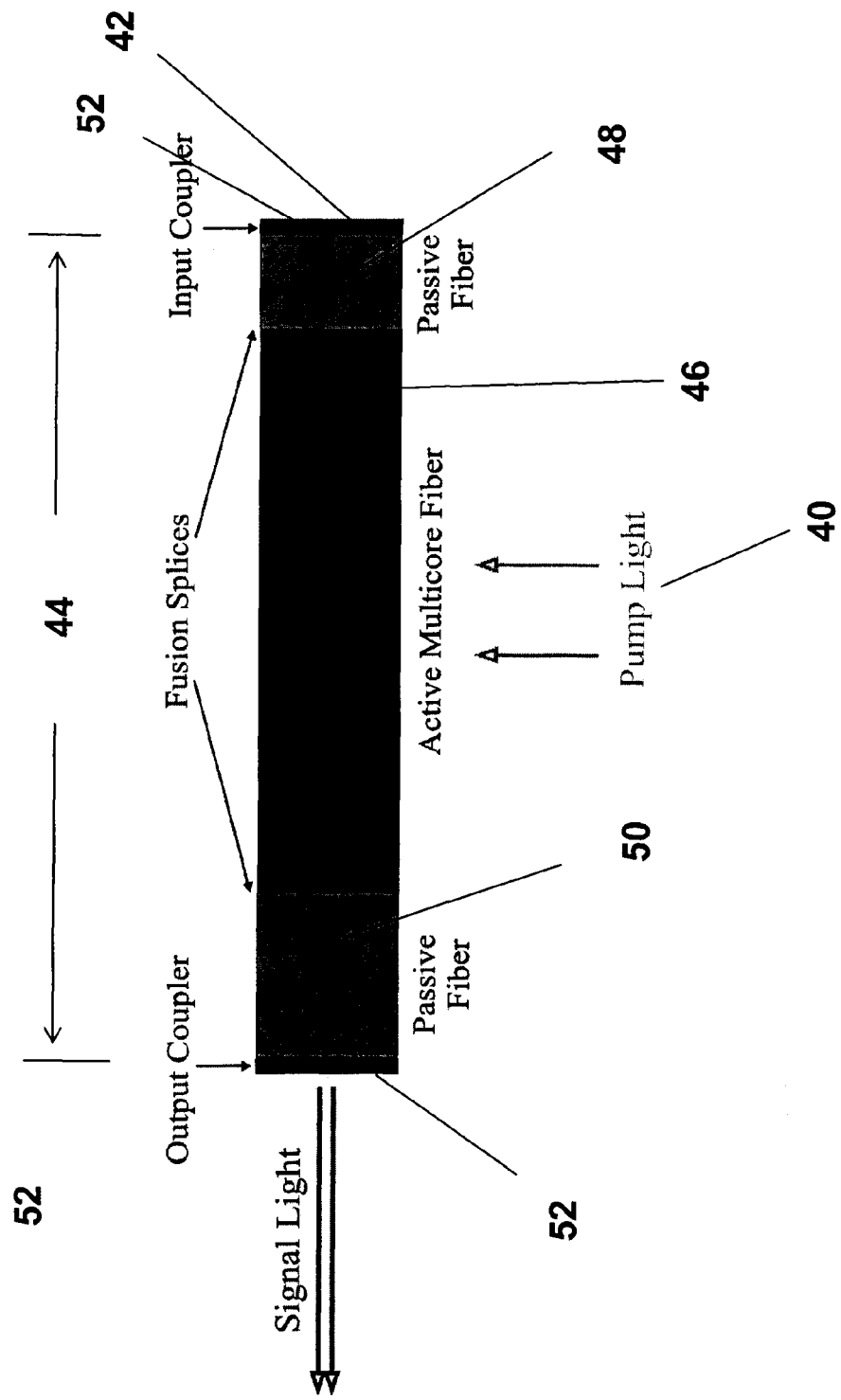
FIG. 3B is an illustration of the fiber laser device: both ends of the multicore fiber are spliced to passive fibers that are coated with dielectric mirrors (length not to scale) which is side pumped.

In general, the in-phase mode selection technique of the present invention can be applied to any pumping scheme including end pumping as in the example embodiments or side pumping where light is coupled from the side into the active fiber as is shown in FIG. 3B.

In one embodiment, $P_2O_5$ can be used as the glass former in the MCF sections. The fibers can be drawn using the stack-and-draw technique, such as previously described. Two different PG preforms can be made; one being undoped, and the other being Er—Yb codoped. Both preforms are drawn to stacking cells, which are stacked together, and the whole stack is inserted into a tube made of another undoped PG. The tube glass has a lower index to confine the pump light inside the patterned inner cladding. By adjusting the drawing temperature, MCF sections can be fabricated with an identical outer diameter and pitch Λ but different diameter to Λ ratios.

The MCF sections can be doped at levels of for example $1.1 \times 10^{26}$ $Er^{3+}$ ions/m$^3$ and $2.2 \times 10^{26}$ $Yb^{3+}$ ions/m$^3$. Doping the core can introduce an index difference ($\Delta n = n_{core} - n_{clad}$). That being said, core and cladding glasses with $\Delta n$ of a suitable range, e.g., from $-5 \times 10^{-3}$ to $+5 \times 10^{-3}$, or $-1 \times 10^{-3}$ to $+1 \times 10^{-3}$ can be chosen.

Testing of this active 19-core MCF (MC19) is shown in FIG. 5(a). The supermodes of this MC19 have been calculated using a finite element method with the near- and far-field intensity distributions of the in-phase supermode and are shown in FIGS. 5(b) and 5(c). The far-field distribution has a full angular spread of 2.4°, corresponding to a 47-μm-diameter effective waist for the Gaussian envelope of the in-phase supermode.

In order to provide a better understanding of these novel aspects of this non-core passive and multicore arrangement, presented below is 1) a detailed mathematical analysis of the supermode selection provided by the invention and 2) several working examples.

Numerical Analysis of the in-Fiber Supermode Selection

One common and effective approach to provide a differential feedback for MCF supermode selection is to use the free-space Talbot effect, which states that a coherent one-dimensional periodic wave reproduces its initial field distribution after it propagates a certain distance. This characteristic distance is called the Talbot distance, $$Z_T = 2\Lambda^2/\lambda, \quad (1)$$

where λ is the free-space wavelength and Λ is the periodicity of the initial field.

Figure 4:
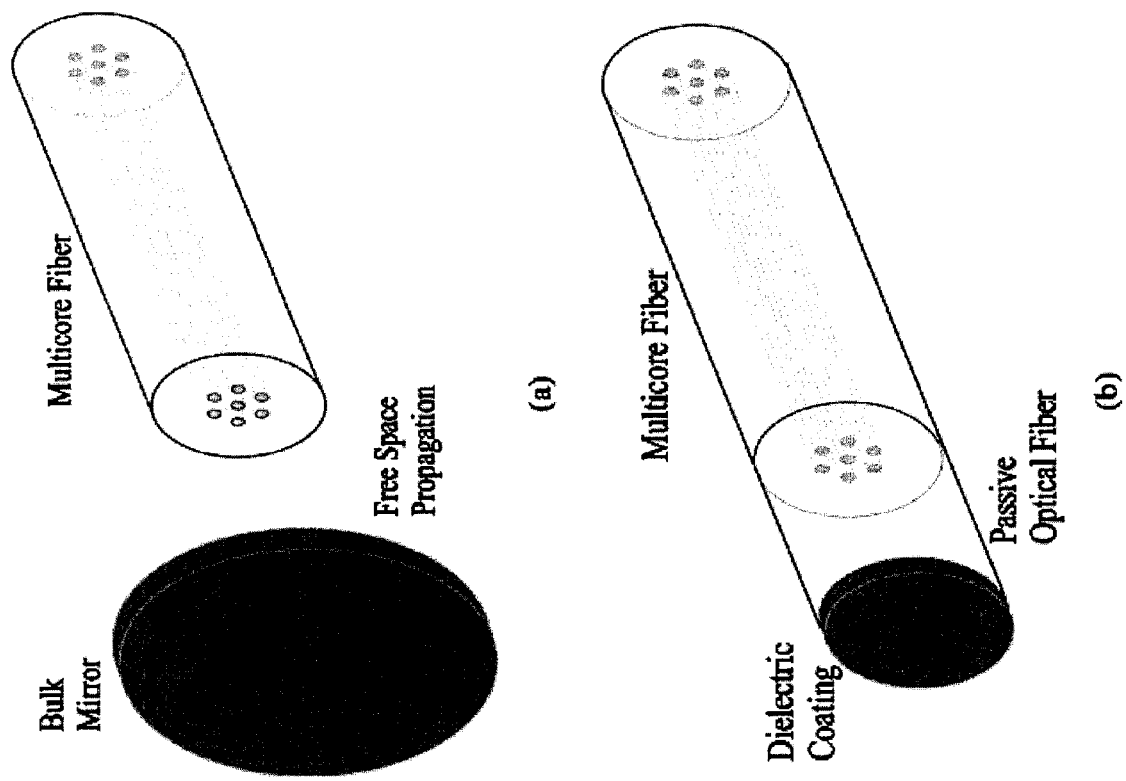
FIG. 4(a) is a diagram showing a free-space Talbot cavity and 4(b) shows an all-fiber cavity utilizing a mirror coated passive optical fiber.

To utilize the Talbot effect for supermode selection in a MCF laser cavity, a typical setup is to place a mirror at a distance $Z_M$ from the MCF, as illustrated in FIG. 4(a). The MCF supermodes exit the facet at Z=0 and re-enter the MCF after completing a round trip between the mirror and the facet. When the mirror position $Z_M$ matches $Z_T/2$ of a MCF supermode i, this mode is to have the maximal amplitude reflection coefficient $\gamma_i(Z=2Z_M)$ [22]:

$$\gamma_i(Z) = \frac{\left| \int_{-\infty}^{\infty} A_i^*(x, y, 0) A_i(x, y, Z) \, dx \, dy \right|}{\left| \int_{-\infty}^{\infty} A_i(x, y, 0) A_i^*(x, y, 0) \, dx \, dy \right|}, \quad (2)$$

where $A_i(x,y,0)$ represents the initial field, $A_i(x,y,Z)$ denotes the reflected field, and the ratio of the overlapping integrals $\gamma_i(Z)$ defines the modal amplitude reflection (coupling) coefficient. Therefore, by placing the mirror at $Z_T/2$ of the in-phase mode (or at multiples of $Z_T/2$), the fundamental mode will have the maximum $\gamma_i(Z)$ and all higher-order modes suffer larger diffraction and coupling losses.

To replace the inconvenient air gap and bulk mirror in the previous Talbot cavity fiber laser, in the invention, a multimode passive optical fiber is attached to the active MCF as shown in FIG. 4(b). Inside the extended passive fiber section, the confined supermodes exit and couple back into the MCF after completing the round trip. If the radial dimension of the passive fiber is sufficiently large and the supermodes never expand enough to reach the lateral boundary during the round trip, this approach is essentially identical to the free-space Talbot cavity method, except for replacing λ in Eq. (1) with λ/n, with n being the refractive index of the fiber material. However, to facilitate a practical fiber fusion splice process for attachment, the passive fiber is typically chosen to have the same or comparable dimension as the MCF, which is not large enough to be treated as the free-space medium and its particular modal properties must be considered. Therefore, inside the multimode passive fiber, supermode selection becomes a combined result of diffraction, Talbot effect, and multimode interference (MMI). Numerical analysis of the MCF laser of the invention finds pronounced differences in the amplitude reflection coefficients between propagation in the bulk medium and inside a multimode fiber.

Considering a MC19 that has a two-dimensional isometric core array, as shown in FIG. 5(a), each single-mode core has a diameter of 7.6 μm and a numerical aperture of 0.12 at 1.5 μm. The double-cladded MC19 has an outer diameter (OD) of 200 μm and the inner cladding is primarily for pump light confining. Supermodes of this MC19 have been calculated utilizing a finite-element method (FEM), and the near- and far-field intensity distributions of the fundamental in-phase mode are shown in FIGS. 5(b) and 5(c), respectively. The far-field Gaussian-like beam has a full angular spread of 0.04 rad.

To select the in-phase mode with an all-fiber device, a passive NCF having the same OD of 200 μm was selected. The calculations assumed one end of the NCF is spliced to the MC19, while the other end was perpendicularly cleaved and coated with a mirror of 100% reflectivity, as shown in FIG. 4(b).

A mode expansion method (MPM) is used to calculate the modal amplitude reflection (coupling) coefficient $\gamma_i(Z)$ of every supermode propagating inside the NCF. The calculations begin by first launching and projecting a MC19 supermode onto an eigenmode basis of the NCF. Then, the propagating property of every excited eigenmode inside the NCF was calculated. Finally, at positions for evaluation of the supermode, the field was reconstructed by summing up all the excited NCF eigenmodes. Considering the large diameter of the NCF as well as the substantial refractive index difference between the NCF and the surrounding air, the NCF is highly multimode. One would thus expect tens of thousands of NCF eigenmodes are needed in the basis to validate the MPM, which makes the calculation infeasible. However, it was found that >99.9% of the energy of a launched MC19 supermode is contained in only several hundred excited NCF eigenmodes, which greatly reduces the calculation volume.

Figure 6:
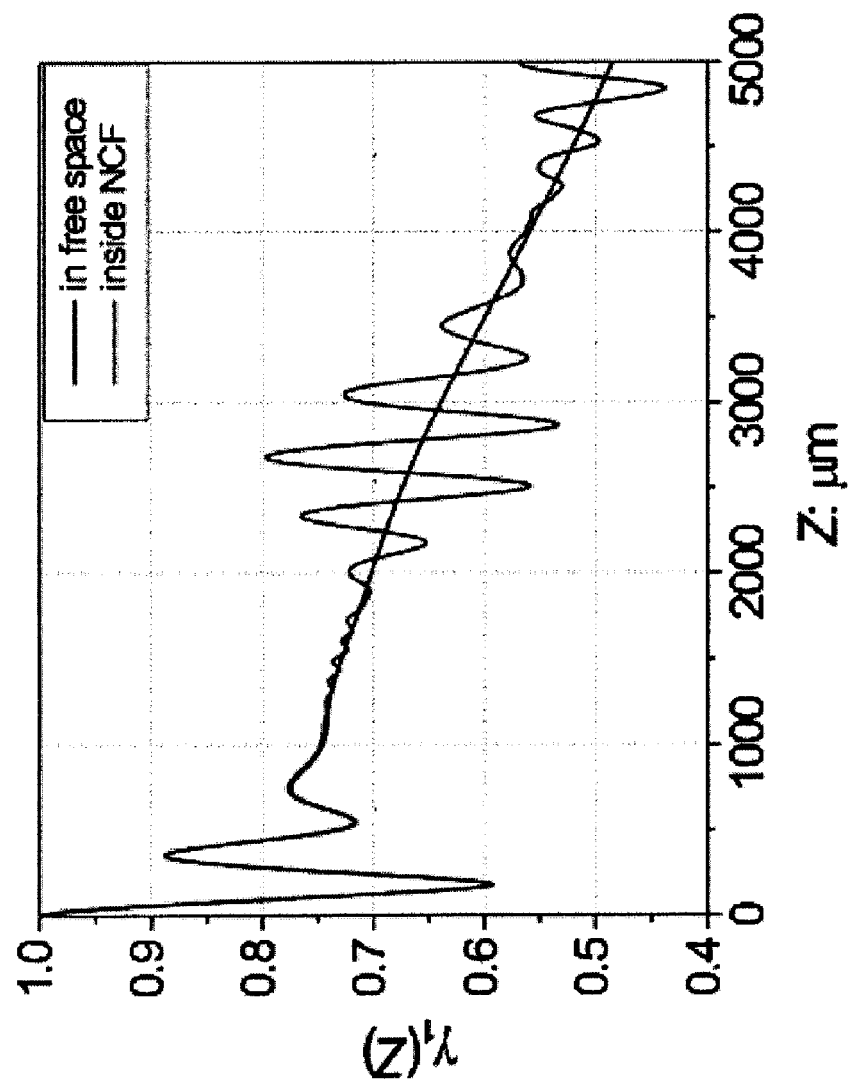
FIG. 6 illustrates a calculated function $\gamma 1(z)$ of the MC19 in-phase supermode, in free space (solid curve) and inside NCF (dashed curve)
Figure 7:
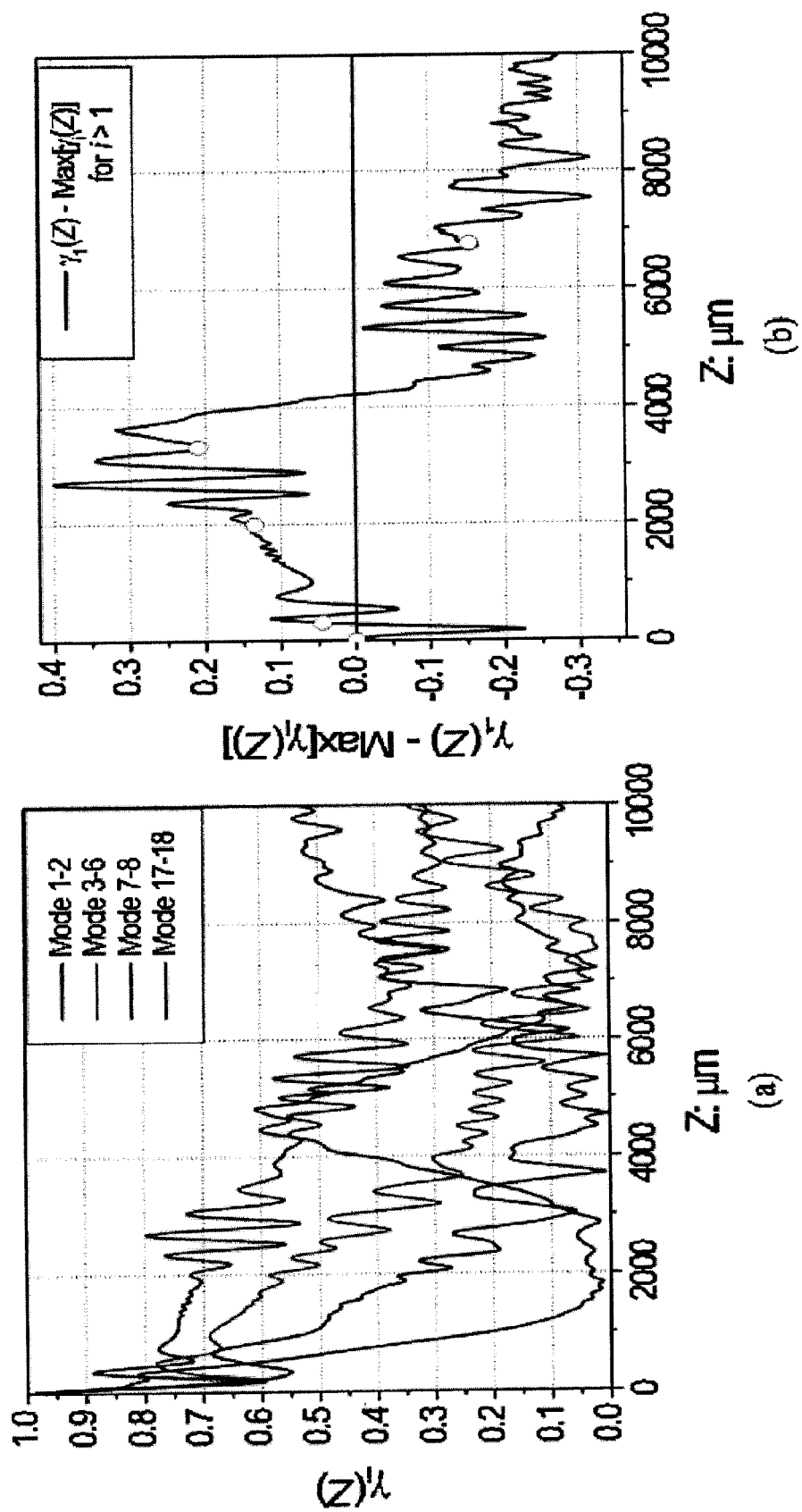
FIG. 7 illustrates (a) calculated $\gamma i(z)$ of selected MC19 supermodes inside the NCF and (b) the difference between $\gamma 1(z)$ and the maximum of $\gamma i(z)$ of all higher order modes.

To understand the supermode selection inside the NCF, one compares the difference in $\gamma_i(Z)$ between inside the NCF [FIG. 5(b)] and in the free-space Talbot cavity [FIG. 5(a)]. Choosing the in-phase mode as an example, we obtain $\gamma_i(Z)$ in the NCF by MPM, shown as the dashed curve in FIG. 6. For the free-space Talbot cavity, a 100% reflecting mirror is assumed, the free space is assigned with the same refractive index as the NCF, and a vectorial diffraction method was used to calculate $\gamma_i(Z)$. The result is shown as the solid curve in FIG. 7. The two curves are identical at Z<1000 μm where the in-phase mode has not expanded large enough to reach the NCF lateral boundary. This coincidence confirms the validity of the MPM by the fully vectorial diffraction calculation. For Z>1000 μm, the free-space curve monotonously declines, while the NCF curve shows a strong oscillatory behavior resulting from the MMI self-imaging effect. The high maxima in the NCF $\gamma_i(Z)$ curve from Z=~2200 to 3200 μm indicate a potentially more efficient all-fiber laser device compared with the free-space Talbot cavity laser.

The $\gamma_i(Z)$ of all MC19 supermodes inside the NCF was calculated. Several selected $\gamma_i(Z)$ of higher-order modes, along with $\gamma_i(Z)$, are shown in FIG. 7(a). It is clearly observed that once Z reaches ~4000 μm, at least one higher-order $\gamma_i(Z)$ catches up with or even surmounts $\gamma_i(Z)$. This behavior indeed deviates from the free-space Talbot cavity case, in which once the mirror is pulled sufficiently away from the MCF facet, the larger the separation, the better the selection of the in-phase mode.

Finally, to decide the optimal NCF length, the difference between $\gamma_1(Z)$ and the maximum of all $\gamma_i(Z)$ for i>1 was plotted, as shown in FIG. 7(b). The best positive contrast between the in-phase mode and higher-order modes is achieved with Z ranging from ~1500 to 4000 μm. Further, when Z>4200 μm, $\gamma_1(Z)$ becomes smaller than $\gamma_i(Z)$ of some higher-order modes, meaning that a longer NCF does not favor the in-phase mode selection, in striking contrast to the free-space cavity scenario.

Moreover, the effect of misalignment between the passive fiber sections and the multi-core gain section has been studied (as described in the Li et al reference "Multimode interference in circular step-index fibers studied with the mode expansion approach," note above and incorporated herein by reference) by analyzing a misaligned structure where the center of the passive section NCF was shifted by 1 μm with respect to the center of a multicore fiber MCF in the horizontal direction. A comparison to a perfectly aligned NCF-MCF structure indicated that the reflection (coupling) coefficient γ in the misaligned structure is always lower than that of the aligned one. Furthermore, while a small misalignment between the NCF and the MCF reduces the reflection coefficient γ (or coupling efficiency), the misalignment does not change the self-imaging positions, indicating a robustness in the design.

Examples of Non-Core-Fiber-Spliced Multi-Core Fiber Lasers

Although, examples are described herein which illustrate 12, 19 or 37 fiber cores embedded in the inner cladding, the present invention is not limited to these examples and any number of fiber cores greater than two may be used to implement the present invention.

Figure 8:
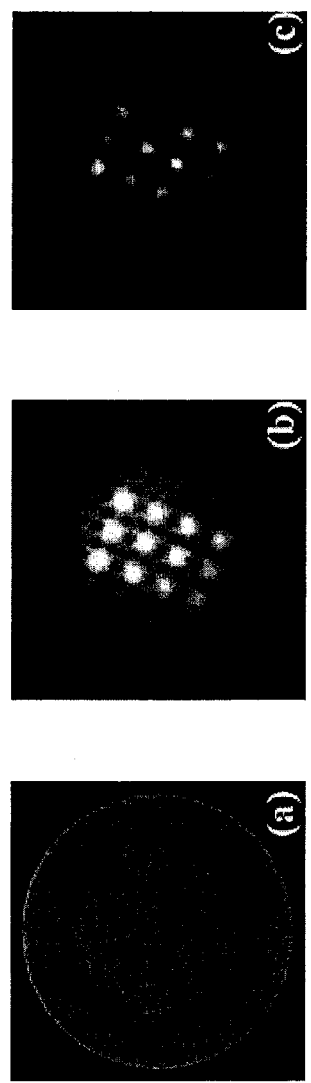
FIG. 8 illustrates microscopic images of the output facet of a MC12 (a) without pumping, (b) spontaneous emission, (c) stimulated emission, (d) far-field intensity of the MC12, (e) far-field intensity distribution of the phase-locked 12-core microstructured Er/Yb co-doped phosphate fiber laser, and (f) optical spectra of free-running (dashed line) and in-phase operation (solid line) of the 12-core microstructured Er/Yb co-doped phosphate fiber laser.
Figure 8:
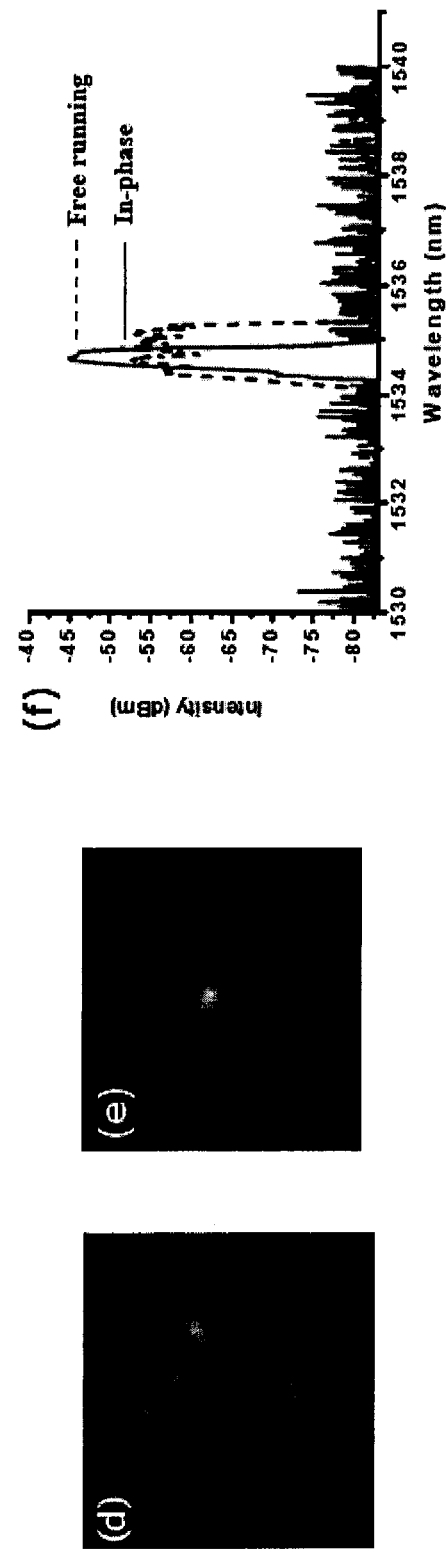

An example of a MC12, a 12-core microstructured fiber was fabricated by the method of stack-and-draw described above. The 12 cores were arranged in a 3 by 4 rectangular array, as shown in FIG. 8(a). The diameter of individual doped-cores is 8.5 μm and that of air holes is about 2 μm. The pitch of the microstructure is 8 pm and that results in the periods of the core array to be 14 μm and 16 μm in x and y directions, respectively. The refractive index of the core is 1.5698 and that of the cladding is 1.5690. This microstructure results in 12 individual cores with a numerical aperture of 0.16 and a modal field diameter of 11 μm. Therefore, the effective modal area of the whole structure is 1140 μm². The individual cores are co-doped with 1 wt % $Er_2O_3$ and 2 wt % $Yb_2O_3$, respectively. The MCF has an outer diameter of 125 μm which enables directly end-pumping by a multimode fiber coupled diode laser.

For pump powers below the lasing threshold individual cores emit only spontaneous emission and operate to a large extend separately, resulting in nearly identical intensities of individual cores as shown in FIG. 8(b). In contrast, when pumping the MCF above the lasing threshold, individual cores do not operate separately any more. In this case, the cores interact due to evanescent coupling between neighboring cores, and the intensity of individual cores has an uneven distribution which reflects a combined near-field pattern of several lasing supermodes, shown in FIG. 8(c).

According to the modal analysis of laser arrays, in a laser array with N elements, the interaction among the elements results in the formation of a set of N supermodes, each being a linear superposition of the individual cores modes. Therefore, there exist 12 supermodes (neglecting polarization effects) for the 12-core microstructured fiber laser. Without any modal selection mechanism, however, supermodes with higher gain and lower cavity round trip loss are most likely to emit in a free-running MCF laser. The typical far-field pattern of a free-running 12-core microstructured fiber laser is shown in FIG. 8(d). The far-field distribution is characterized by multiple peaks, in striking contrast to an incoherent addition of 12 individual lasers. The pattern indicates the oscillation of several supermodes, resulting in wide diffraction and a beam profile that is of little practical use. In contrast, the fundamental supermode, corresponding to adjacent cores emitting in phase (therefore also called in-phase supermode), is the most desired emission mode of a laser array, because its far-field beam pattern is single-lobed centered around zero degree. As shown in FIGS. 8(e) and (f), in-phase supermode operation gives a narrower emission spectrum than free-running operation does and provides an astonishing enhancement in beam quality.

A MC19 optical device with specifications above were manufactured utilizing a stack-and-draw process for microstructured optical fibers. The microscopic photograph of the cross section of the drawn MC19 is shown in FIG. 9(a). The MC19 is made of phosphate glasses, and the cores are heavily codoped with $Er^{3+}$ and $Yb^{3+}$ ions (1.5 wt. % of $Er_2O_3$ and 8.0 wt. % of $Yb_2O_3$) for compact high-power fiber laser applications. An OD 200 μm NCF, also made of phosphate glass, is chosen as the modal selection element in the all-fiber laser cavity.

First, a short piece (10 cm) of MC19 is cleaved at both ends and served as the gain medium. The high concentrations of $Er^{3+}$ and $Yb^{3+}$ ions in the cores ensure sufficient pump absorption even with such short fibers. Then, a piece of NCF was spliced to one end of the MC19, and the other MC19 end is pumped with 975 nm laser diodes. The pump light is butt coupled into the MC19 cladding by a multimode fiber whose facet is coated with a broadband 1.5 μm high reflector. The far-field intensity pattern of the output beam is recorded on a screen set at 7.5 cm away from the cleaved NCF output end.

To determine the NCF length influence upon modal selection, several NCFs of length varying from 0 to 3500 μm (equivalent Z value doubles) were spliced to the MC19 section. Specifically, MC19 lasers with NCF lengths equivalent to Z=0, 312, 1984, 3320, and 6760 μm. The far-field emission patterns are shown in FIGS. 9(b)-9(f). With none (Z=0) and short (Z=312 μm) NCF section, where the in-phase mode is not positively distinguished, the output beam shows a fast spread; with NCF length increased to Z=1984 and 3320 μm, where $\gamma_1(Z)$ is predicted to have a substantial advantage, the beam quality observed is noticeably improved; with further lengthened NCF (Z=6760 μm) where higher-order modes are favored, the beam quality deteriorates again. The optimal NCF length range for this example is from 1984 to 3320 μm and agrees with the calculations.

Figure 9:
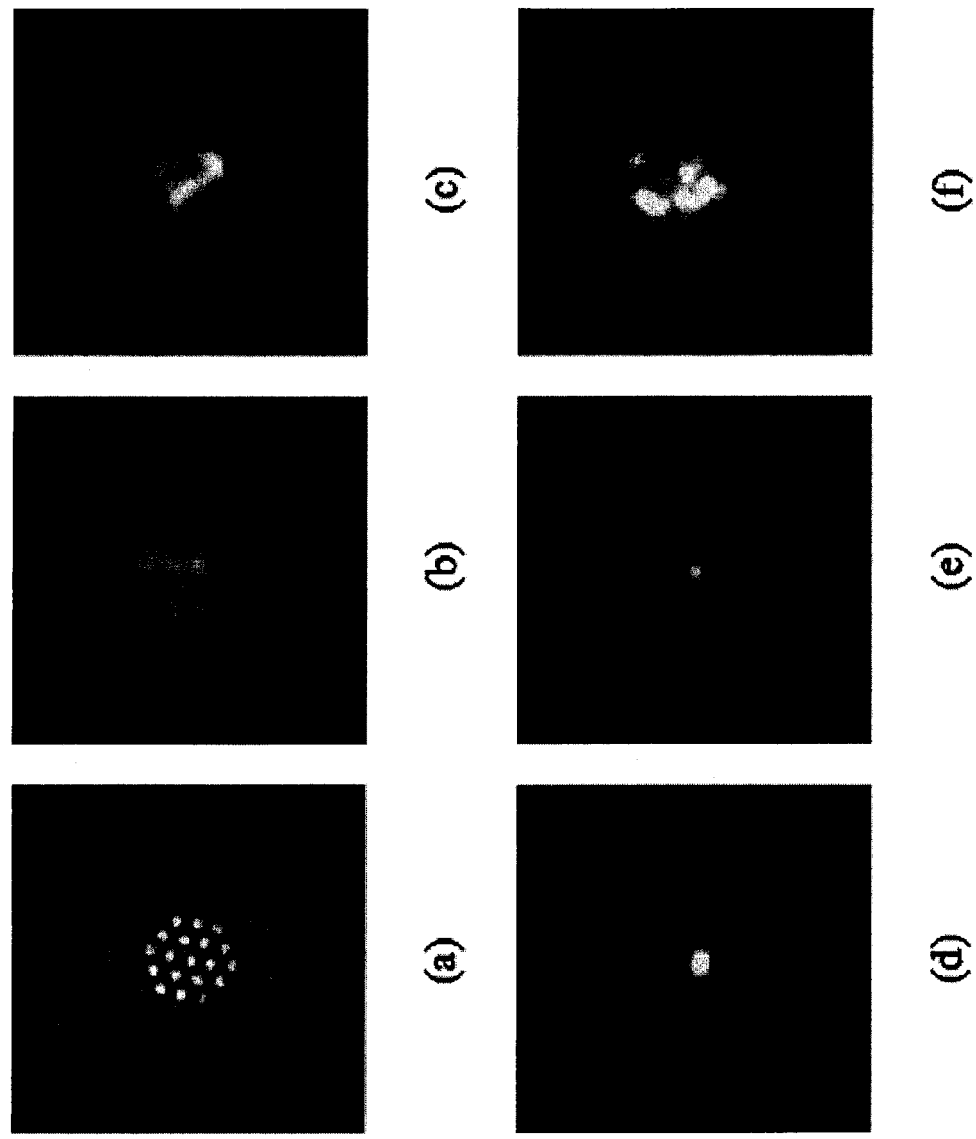
FIG. 9 illustrates (a) a microscopic photo of the cross section of the drawn MC19 and recorded far-field emission patterns from MC19 lasers with spliced NCF of lengths equivalent to $Z(\mu m)$=(b) 0, (c) 312, (d) 1984, (e) 3320 and (f) 6760.
Figure 10:
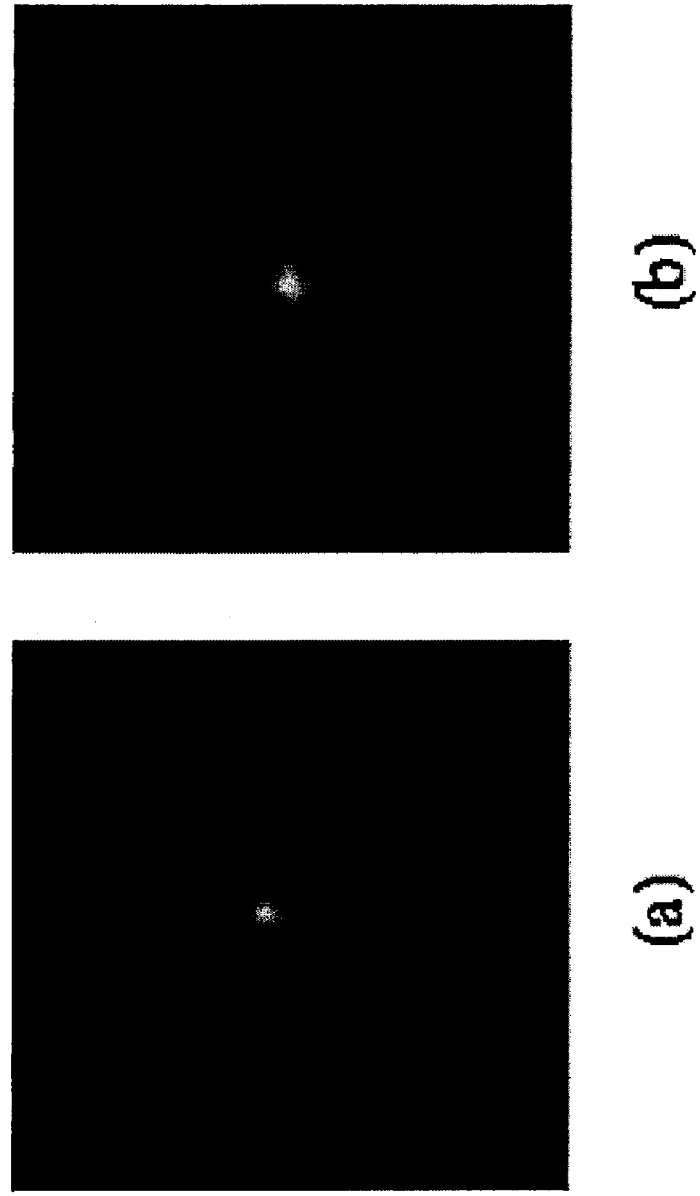
FIG. 10 illustrates far-field emission patterns of MC19 lasers spliced with NCF at both ends, (a) MC19 of OD 200 μm and (b) MC19 of OD 125 μm.

As shown in FIGS. 9(d) and 9(e), though the on-axis intensity of the MC19 laser emission is enhanced considerably by one piece of spliced NCF, the higher-order mode contributions are still significant. To further improve the beam quality with reinforced mode selecting effect, a second piece of NCF is spliced at the MC19 pump end, in addition to the NCF at the output end. The effective length of this second NCF was determined experimentally, and found that the optimal NCF combination for the OD 200 μm MC19 laser is with ~1700 μm long NCF at the output end and ~550 μm long NCF at the pump launching end. The far-field intensity pattern of the output beam from this MC19 laser device is shown in FIG. 10(a), as a clean on-axis spot is observed with a horizontal angular spread of ~0.04 rad, agreeing with the calculated value of the in-phase mode. Comparing FIG. 10(*a*) with FIG. 9(*b*), an astonishing enhancement in beam quality demonstrates the validity of our all-fiber supermode selection approach.

The NCF mode selection approach is not limited by the fiber dimensions shown above. Another MC19 has been drawn with a smaller OD of 125 µm. It has the identical design as the larger MC19 with every dimension proportionally scaled down. A passive phosphate NCF of OD 125 µm is utilized as the mode selecting fiber. By following the same process upon the larger MC19, an all-fiber OD 125 µm MC19 laser operating at the in-phase mode was fabricated and tested, with ~210 µm long NCF spliced at the output end and ~200 µm long NCF at the pump end. The far-field intensity pattern of the output beam is shown in FIG. 10(*b*). This all-fiber laser structure had a Gaussian-like beam showing a full angular spread of 0.05 rad, closely matching the theoretical value of 0.06 rad of the in-phase mode.

The demonstrated in-phase supermode oscillation of our all-fiber MCF lasers is seen to be fundamentally robust. Possible fluctuations in relative optical pass length are minimized since all cores are embedded in the same cladding. More importantly, all cores of the array are coupled optically and forced to emit collectively into one supermode. Due to this coupling, the cores cannot be treated as independent lasers with specific and varying relations among each other. To date, no instabilities that might occur due to temperature gradients at high-power operation have been observed.

Figure 11:
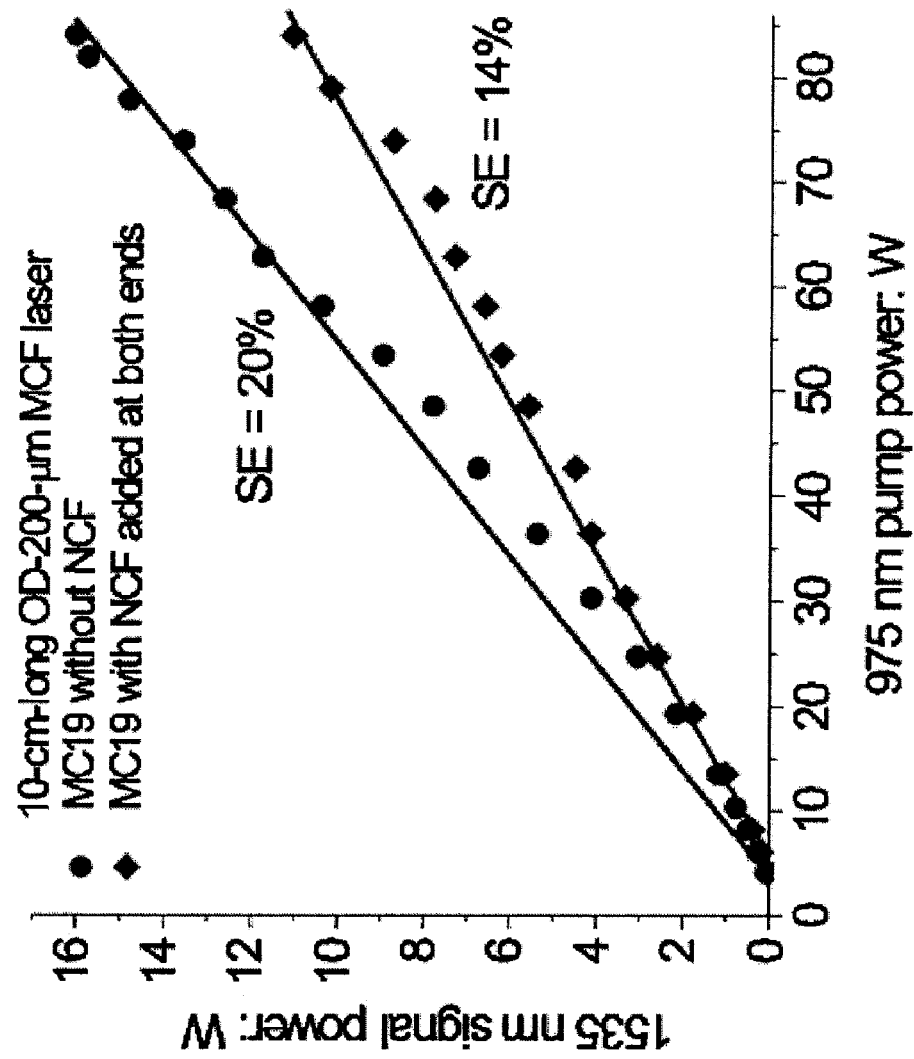
FIG. 11 illustrates a signal versus pump power plots of 10 cm long MC19 lasers with (solid diamonds) and without (solid circles) NCF spliced thereto.

In another example, a piece of 10 cm long OD 200 µm MC19 was used as the active medium to construct the fiber laser. To improve the overall laser efficiency, a dielectric mirror, which is highly reflective at 975 nm and has a reflectivity of ~54% at 1.5 µm, was added at the output end. A first fiber laser using the 200 µm MC19 gain section was tested solely with MC19 without NCF attached. A maximum output power of 16 W is obtained with a slope efficiency (SE) of 20% with respect to the launched pump power. A second MC19 laser is fabricated with both ends spliced with NCFs of a length specified in FIG. 11. A maximum output power of 11 W is achieved with an SE of 14%. The signal versus pump power plots of both devices are shown in FIG. 11. The decreased efficiency of the second laser device results mainly from the relatively large splice losses between the MC19 and NCF, which could be reduced by optimizing the splice process. With free-space Talbot cavity phase-locked fiber lasers (utilizing the same MC19), a SE better than 5% has not been achieved, which confirms the advantage of the all-fiber structure for laser efficiency.

Figure 12:
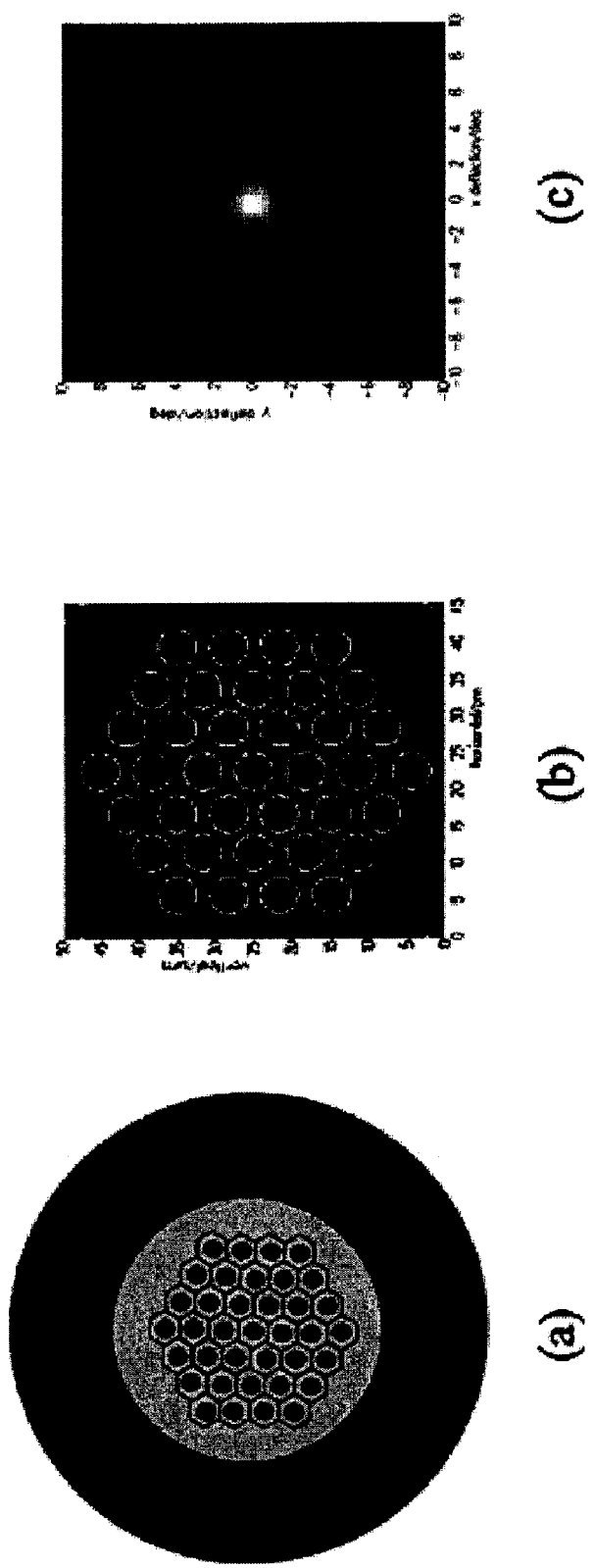
FIG. 12 illustrates an isometrically distributed 37-core MCF (a) shows the cross section, (b) shows a simulated near-field distribution of the in-phase supermode, and (c) shows a simulated far-field distribution of the in-phase supermode.

Based on the design of the previous MC19, another ring of cores was added to form an isometrically distributed 37-core MCF (MC37), as shown in FIG. 12(*a*). The supermodes of the MC37 were calculated for the in-phase mode, and its near-field intensity distribution is shown in FIG. 12(*b*), and the Gaussian-like far-field intensity pattern is shown in FIG. 12(*c*).

Figure 13:
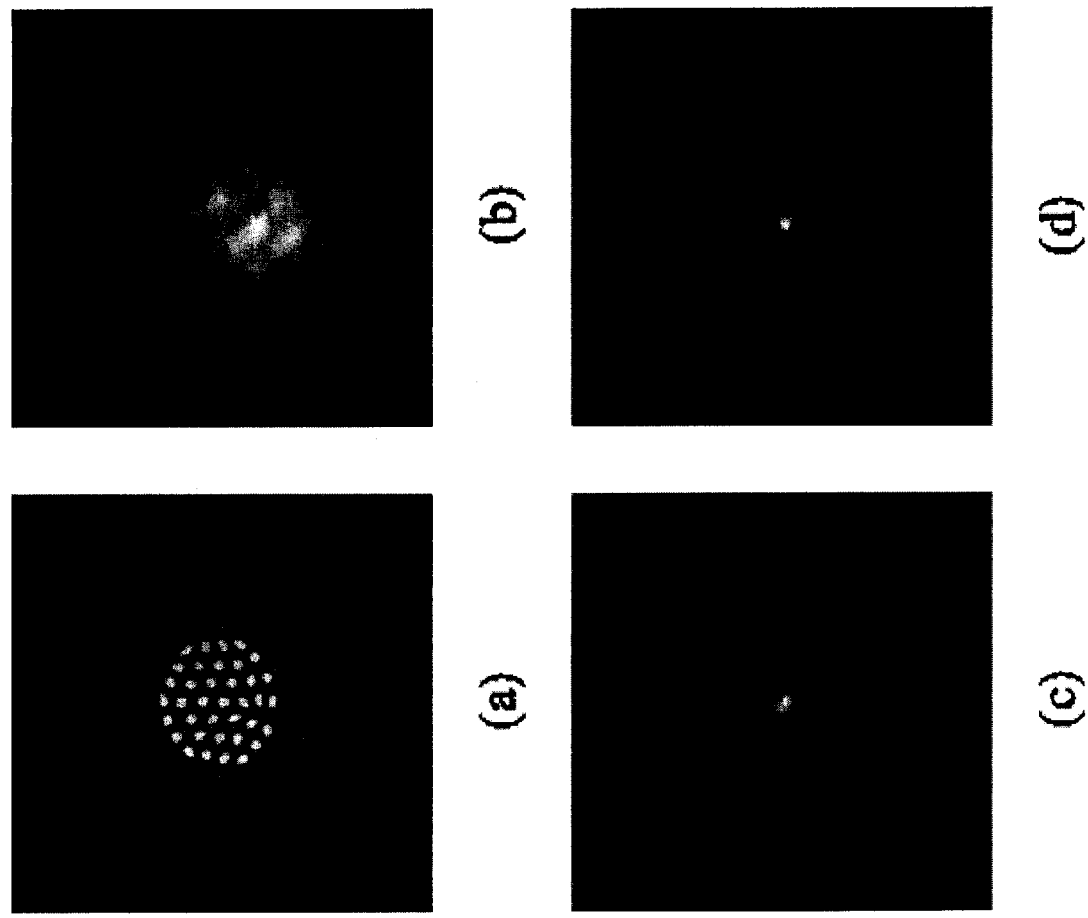
FIG. 13 illustrates (a) a microscopic photo of the cross section of the drawn MC37, (b) recorded far-field emission patterns from an MC37 laser without NCF spliced and far-field emission patterns of MC37 lasers spliced with NCF at both ends, (c) MC19 of OD 200 μm and (d) MC19 of OD125 μm.

MC37 gain sections with different ODs, 125 and 200 µm that should be nominally the same diameter throughout, respectively, were fabricated and tested. The cross section of the manufactured MC37 is shown in FIG. 13(*a*). The far-field emission pattern from a bare MC37 laser without modal manipulation is shown in FIG. 13(*b*). In the finalized MC37 laser devices, both ends of a piece of 10 cm long MC37 are spliced with NCFs for enhanced mode filtering effect. For the OD 125 µm MC37 laser, with NCF of ~520 µm long at the output end and ~925 µm long at the pump end, the recorded far-field intensity pattern is shown in FIG. 13(*c*). The Gaussian-like beam has a full angular spread of 0.05 rad that matches well with the calculated in-phase mode value of 0.06 rad. For the OD 200 µm MC37 laser, with 1650 µm long NCF at the output end and 3000 µm long NCF at the pump end, the far-field emission pattern is shown in FIG. 13(*d*). The full width at half maximum (FWHM) of the central lobe is measured to be 0.03 rad, which is identical to the theoretical value of the in-phase mode. Overall, the distinctive difference in beam quality from FIG. 13(*c*) and FIG. 13(*d*) to FIG. 13(*b*) is clearly observed and the effectiveness of our all-fiber modal selection technique is well demonstrated even with larger-scale core arrays.

From these results for the different multi-core and passive fiber configurations, it is clear that the invention provides one with the ability to select the in-phase emission from a variety of different multi-core arrangements in the gain section by the same principle of adding appropriate length of passive multimode fiber to either one or both sights of the MCF. For example, the above results show that, even for different fiber diameters, different numbers of core sections, and even under misalignment, by appropriate choice of passive section attachments, a length of the passive section(s) can be set such that the gain section and the passive section(s) form an optical cavity which selectively promotes in-phase light emission from the optical cavity.

In addition, MCF also provide the possibility of tailoring the polarization and propagation properties of the fiber laser emission due to the large number of free design parameters including core profiles and arrangements, but also other details of the MCF structure. For example by integrating air-hole microstructured claddings and multicore configurations, custom-shaped in-phase emission of core arrays can be devised. In one example, the previously described 12-core fiber with microstructured cladding shown in FIG. 8 (*a*), it has been demonstrated by Zhu et. al. (Opt. Express 2007) that the in-phase emission of this particular MCF laser is birefringent, i.e., the two polarization states have different propagation constants. This is a consequence of the design of the core arrangement and not a property of the individual cores which do not posses this property of birefringence. Another designable property is the divergence angle of the in-phase mode in different directions and the details of the in-phase emission spectrum as shown, for example, in FIG. 8 (*f*).

Thus, the invention provides flexibility in that supermode operation where light emission, in a far field, exhibits a singular Gaussian-like intensity distribution is possible under a variety of different configurations and the specific characteristics of the supermode can be tailored through details of the multicore arrangement.

Method of Producing Optical Fiber Amplifiers and Lasers

Figure 14:
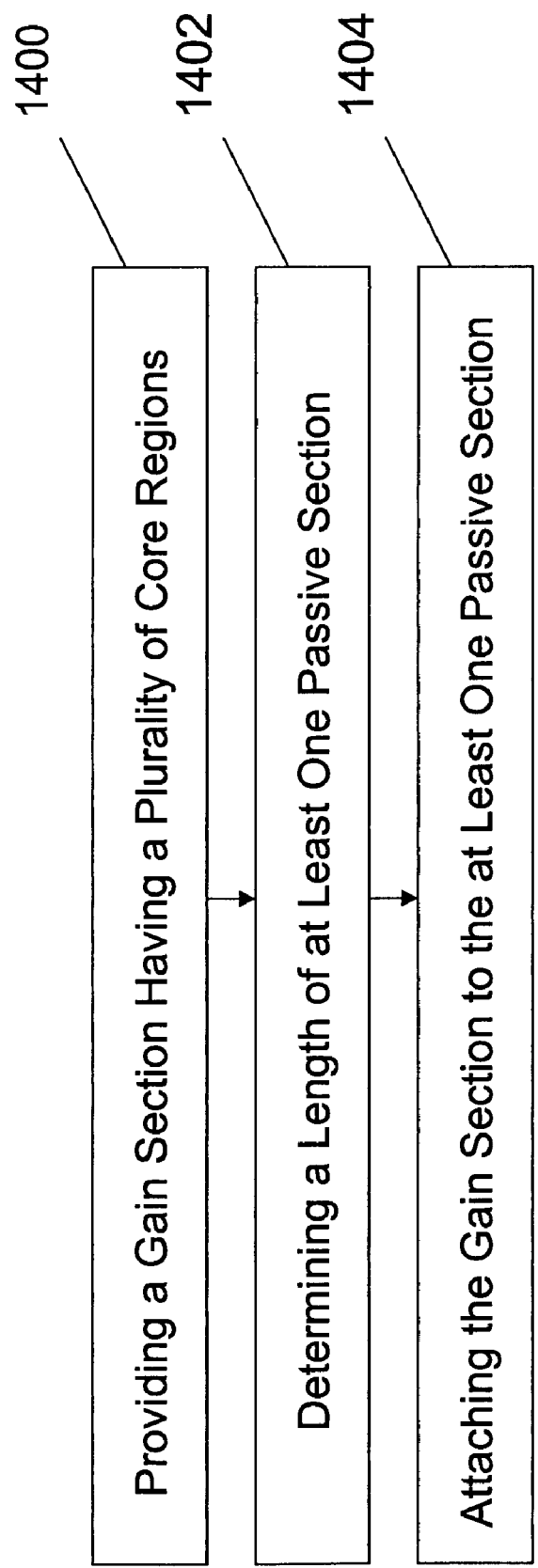
FIG. 14 illustrates a method of forming an optical device according to an embodiment of the invention.

In one embodiment of the invention, there is provided a method for producing an optical fiber amplifier and laser as illustrated in flow chart FIG. 14. At 1400, a gain section is provided having a plurality of core regions including dopant species configured to absorb incident radiation at a first wavelength and to emit radiation at a second wavelength. At 1402, a length of at least one passive section to be attached to the gain section is determined such that the gain section and the at least one passive section form an optical cavity which selectively promotes in-phase light emission from the optical cavity. At 1404, the gain section is attached to the at least one passive section.

At 1400, a gain section can be provided having at least one of a twelve core region, a nineteen core region, or a thirty seven core region, the plurality of core regions in the gain section can be a periodic array, and/or the plurality of core regions can have a core area greater than 200 µm², for example between 200 μm² and 20000 μm². At 1400, a gain section can be provided in which the dopants are at least one of the rare earth elements, Er, Yb, Nd, Ho, and Pr, or metals such as Fe and Cr, and the dopants can have a concentration of at least $10^{19}$ cm³.

At 1402, first modal amplitude reflection coefficients can be calculated for in-phase modes of the emitted radiation from the plurality of core regions. Additionally, second modal amplitude reflection coefficients can be calculated for higher order modes of emitted radiation from the plurality of core regions. The first modal amplitude reflection coefficients and the second modal amplitude reflection coefficients are compared as a function of the length of the at least one passive section. A length is selected where the first modal amplitude reflection coefficients (i.e, for the in-phase modes) are substantially greater than the second modal amplitude reflection coefficients (i.e, for the higher order modes). For instance, a difference of 10% or more would be a sufficient difference to promote in-phase mode lasing and can be considered substantial. Alternatively, at 1402, the length can be determined for two passive sections attached on opposite ends of the gain section where the length is derived theoretically or experimentally such that the observed laser light emission from one or both of the two passive sections, in a far field, has a singular Gaussian-like intensity distribution about a longitudinal axis extending from the gain section. In this embodiment, the two passive sections can have different lengths. Regardless, the length(s) of the passive section(s) are set to promote laser light emission in which all of the plurality of core regions emit light in phase. In addition, length(s) suitable for the invention can range from 20 and 20000 microns for these passive sections.

At 1404, the gain section can be attached by fusion splice to the passive sections. The splice and the passive sections are designed to produce low loss in the optical device, as explained above.

Numerous modifications and variations on the present invention are possible in light of the above teachings. It is, therefore, to be understood that within the scope of the accompanying claims, the invention may be practiced otherwise than as specifically described herein.

The invention claimed is:

1. A fiber laser comprising:
 an optical fiber having therein a plurality of core regions forming a gain section and including dopant species configured to absorb incident radiation at a first wavelength and emit radiation at a second wavelength;
 at least one passive multi-mode fiber section attached on at least one side of the core regions of the gain section; and
 said gain section and said at least one passive multi-mode fiber section and at least one end reflector attached to the at least one passive multi-mode fiber section comprising an optical cavity which selectively promotes in-phase light emission from the plurality of core regions inside the optical cavity.

2. The laser of claim 1, wherein said optical cavity comprises an all-fiber optical cavity.

3. The laser of claim 1, wherein the at least one passive multi-mode fiber section and the gain section promote light emission from the optical cavity in which all of the plurality of core regions emit light in phase from the optical cavity.

4. The laser of claim 1, wherein the at least one passive multi-mode fiber section comprises two passive multi-mode fiber sections attached respectively to opposite ends of the gain section.

5. The laser of claim 4, wherein the two passive multi-mode fiber sections and the gain section promote light emission from the optical cavity in which all of the plurality of core regions emit light in phase from the optical cavity.

6. The laser of claim 4, wherein the two passive multi-mode fiber sections and the gain section promote light emission from the optical cavity which, in a far field, has a singular Gaussian-like intensity distribution about a longitudinal axis extending from the optical cavity.

7. The laser of claim 4, wherein the at least one passive multi-mode fiber section comprises two passive multi-mode fiber sections of different lengths attached respectively to opposite ends of the gain section.

8. The laser of claim 7, wherein the two passive multi-mode fiber sections and the gain section promote light emission from the optical cavity in which all of the plurality of core regions emit light in phase from the optical cavity.

9. The laser of claim 7, wherein the two passive multi-mode fiber sections and the gain section promote light emission from the optical cavity which, in a far field, has a singular Gaussian-like intensity distribution about a longitudinal axis extending from the optical cavity.

10. The laser of claim 1, wherein the plurality of core regions comprise a twelve core region, a nineteen core region, or a thirty seven core region.

11. The laser of claim 10, wherein the at least one passive multi-mode fiber section comprises two passive multi-mode fiber sections of different lengths attached respectively to opposite ends of the gain section.

12. The laser of claim 11, wherein:
 a diameter of the gain section having said nineteen core region and the two passive multi-mode fiber sections is 200 μm;
 the two passive multi-mode fiber sections comprise a first section having a first length of 1700 μm, and a second section having a second length of 550 μm; and
 a length of the nineteen core region is 10 cm.

13. The laser of claim 11, wherein:
 a diameter of the gain section having said nineteen core region and the two passive multi-mode fiber sections is 125 μm;
 the two passive multi-mode fiber sections comprise a first section having a first length of 210 μm, and a second section having a second length of 200 μm; and
 a length of the nineteen core region is 10 cm.

14. The laser of claim 11, wherein:
 a diameter of the gain section having said thirty seven core region and the two passive multi-mode fiber sections is 125 μm;
 the two passive multi-mode fiber sections comprise a first section having a first length of 520 μm, and a second section having a second length of 925 μm; and
 a length of the thirty seven core region is 10 cm.

15. The laser of claim 11, wherein:
 a diameter of the gain section having said thirty seven core region and the two passive multi-mode fiber sections is 200 μm;
 the two passive multi-mode fiber sections comprise a first section having a first length of 1650 μm, and a second section having a second length of 3000 μm; and
 a length of the thirty seven core region is 10 cm.

16. The laser of claim 1, wherein the plurality of core regions comprises a periodic array.

17. The laser of claim 16, wherein the periodic array comprises at least one of a triangular array, a circular array, a square array, and a rectangular array.

18. The laser of claim 1, wherein the plurality of core regions comprise a core area greater than 200 μm².

19. The laser of claim 1, wherein the dopants comprise at least one of the rare earth elements, Er, Yb, Nd, Ho, and Pr, or metals such as Fe and Cr.

20. The laser of claim 19, wherein the dopants comprise a concentration of at least $10^{19}$ cm$^3$.

21. The laser of claim 1, further comprising:
an optical pumping device configured to irradiate the gain section, such that light is emitted from the optical cavity.

22. The laser of claim 1,
wherein the at least one end reflector attached to the at least one passive multi-mode fiber section comprises reflection coatings on ends of the optical cavity, configured to transmit pumping light and partially reflect light from the interior of the optical cavity.

23. The laser of claim 22, wherein the reflection coatings comprise dielectric materials.

24. The laser of claim 1, further comprising:
a cladding material surrounding at least the gain section.

25. The laser of claim 24, wherein the cladding material comprises at least one of silica, silicate, phosphate, chalcogenide, or fluoride glasses.

26. The laser of claim 1, wherein said incident radiation at said first wavelength comprises a pump source and the second wavelength comprises a laser light is emitted from the optical cavity.

27. The laser of claim 26, wherein the pump source comprises a side-pumped source providing said incident radiation at said first wavelength to the gain section.

28. The laser of claim 26, wherein the pump source comprises a end-pumped source providing said incident radiation at said first wavelength to the gain section through the at least one passive multi-mode fiber section.

29. A fiber laser comprising:
an optical fiber having therein a plurality of core regions forming a gain section and including dopant species configured to absorb incident radiation at a first wavelength and emit radiation at a second wavelength;
two passive multi-mode fiber sections attached respectively on two sides of the core regions of the gain section at opposite ends; and
said gain section and said two passive multi-mode fiber sections and two end reflectors attached respectively to the two passive multi-mode fiber sections comprising an optical cavity which selectively promotes in-phase light emission from the plurality of core regions inside the optical cavity such that said light emission from the optical cavity, in a far field, has a singular Gaussian distribution about a longitudinal axis extending from the optical cavity.

30. A fiber laser comprising:
an optical fiber having therein a plurality of core regions forming a gain section and including dopant species configured to absorb incident radiation at a first wavelength and emit radiation at a second wavelength;
two passive multi-mode fiber sections attached respectively on two sides of the core regions of the gain section at opposite ends; and
said gain section and said two passive multi-mode fiber sections and two end reflectors attached respectively to the two passive multi-mode fiber sections comprising an all-fiber optical cavity which selectively promotes in-phase light emission from the plurality of core regions inside the optical cavity.

31. A method of forming an optical device comprising:
providing an optical fiber having therein a plurality of core regions forming a gain section and including dopant species configured to absorb incident radiation at a first wavelength and emit radiation at a second wavelength;
determining a length of at least one passive multi-mode fiber section to be attached on at least one side of the core regions of the gain section such that said gain section and said at least one passive multi-mode fiber section form an optical cavity which selectively promotes in-phase light emission from the plurality of core regions inside the optical cavity;
attaching the gain section to the at least one passive multi-mode fiber section; and
forming at least one end reflector attached to the at least one passive multi-mode fiber section.

32. The method of claim 31, wherein determining a length of at least one passive multi-mode fiber section comprises:
calculating first modal amplitude reflection coefficients for in-phase modes of said emitted radiation from the plurality of core regions;
calculating second modal amplitude reflection coefficients for higher order modes of said emitted radiation from the plurality of core regions;
comparing said first modal amplitude reflection coefficients and said second modal amplitude reflection coefficients as a function of said length of the at least one passive multi-mode fiber section; and
selecting said length where said first modal amplitude reflection coefficients are substantially greater than said second modal amplitude reflection coefficients.

33. The method of claim 31, wherein determining a length of at least one passive multi-mode fiber section comprises:
providing, for said at least one passive multi-mode fiber section, two passive multi-mode fiber sections attached on opposite ends of the gain section; and
setting said length such that laser light emission from at least one of the two passive multi-mode fiber sections, in a far field, has a singular Gaussian-like intensity distribution about a longitudinal axis extending from the gain section.

34. The method of claim 33, wherein providing two passive multi-mode fiber sections comprise providing two passive multi-mode fiber sections of different lengths.

35. The method of claim 33, wherein setting said length comprises setting said length to promote laser light emission in which all of the plurality of core regions emit light in phase.

36. The method of claim 31, wherein providing a gain section comprises providing a gain section having at least one of a nineteen core region or a thirty seven core region.

37. The method of claim 31, wherein providing a gain section comprises providing a gain section in which the plurality of core regions comprises a periodic array.

38. The method of claim 31, wherein providing a gain section comprises providing a gain section in which the plurality of core regions comprise a core area between 200 μm$^2$ and 20000 μm$^2$.

39. The method of claim 31, wherein providing a gain section comprises providing a gain section in which the dopants comprise at least one of the rare earth elements, Er, Yb, Nd, Ho, and Pr, or metals such as Fe and Cr.

40. The method of claim 36, wherein providing a gain section comprises providing a gain section in which the dopants comprise a concentration of at least $10^{19}$ cm$^3$.

41. The laser of claim 1, wherein the at least one passive multi-mode fiber section comprises two passive multi-mode fiber sections having lengths between 200 and 5000 microns.

* * * * *